United States Patent [19]

Sakai et al.

[11] Patent Number: 5,510,809
[45] Date of Patent: Apr. 23, 1996

[54] CONTROLLER INCLUDING MULTIFUNCTIONS

[75] Inventors: Yoshikatsu Sakai; Kenji Yamaguchi; Masayuki Nakagawa; Masao Yokomori; Katsuhisa Tsuda; Yoshiyuki Kamata, all of Tokyo, Japan

[73] Assignee: Yokogawa Electric Corporation, Tokyo, Japan

[21] Appl. No.: 210,766

[22] Filed: Mar. 22, 1994

Related U.S. Application Data

[63] Continuation of Ser. No. 932,977, Aug. 20, 1992, abandoned.

[30] Foreign Application Priority Data

Sep. 30, 1991 [JP] Japan ................................ 3-251576
Oct. 7, 1991 [JP] Japan ................................ 3-259405
Oct. 18, 1991 [JP] Japan ................................ 3-271249

[51] Int. Cl.$^6$ .................................................. G09G 5/00
[52] U.S. Cl. ............................ 345/140; 345/168; 345/133
[58] Field of Search ............................ 345/140, 35, 133, 345/134, 40, 168, 169, 172; 364/480, 481, 487; 324/378, 379; 73/116, 117.2, 117.3, 117.4

[56] References Cited

U.S. PATENT DOCUMENTS

| | | | |
|---|---|---|---|
| 4,427,969 | 1/1984 | Coppola et al. | 341/141 |
| 4,478,038 | 10/1984 | Cropper et al. | 60/39.02 |
| 4,609,918 | 9/1986 | Nakanishi et al. | 345/35 |
| 4,611,306 | 9/1986 | Crehan et al. | 345/133 |
| 4,695,976 | 9/1987 | Nakanishi et al. | 340/753 |
| 4,745,543 | 5/1988 | Michener et al. | 340/754 |
| 4,782,338 | 11/1988 | Barshinger | 340/754 |
| 4,847,785 | 7/1989 | Stephens | 340/722 |
| 4,851,833 | 7/1989 | Govekar | 180/333 |
| 5,086,870 | 2/1992 | Bolduc | 180/333 |
| 5,250,935 | 10/1993 | Jonker et al. | 345/134 |

FOREIGN PATENT DOCUMENTS

| | | | |
|---|---|---|---|
| 61-062815 | 3/1986 | Japan | 345/35 |
| 2120618 | 5/1990 | Japan | 345/35 |
| 0276912 | 11/1990 | Japan | 340/754 |

OTHER PUBLICATIONS

Electroluminescence: An Appraisal for Avionic Display Applications by Donald J. Pizzcara Mar. 4, 1966.

*Primary Examiner*—Richard Hjerpe
*Assistant Examiner*—Lun-Yi Lao
*Attorney, Agent, or Firm*—Moonray Kojima

[57] ABSTRACT

The controller executes a control calculation based on proportional and integration calculation parameters which are preset, and outputs a control output to a process, and comprises a display device for displaying panels having characters and figures thereon; a panel expanding key for instructing the display device to expand, or change, the panel to be displayed; a plurality of keys for setting control operations and various parameters; an operating panel generating unit for displaying as a bar graph a process value and a control output value on an operating panel to be displayed on the display device; a trend graph panel generating unit for displaying the transition of the process value on a trend graph panel to be displayed on the display device; a tuning panel generating unit for displaying information to control the control parameter used in the control calculation on a tuning panel to be displayed on the display device; a display controlling unit for controlling the displays of the panels; and an operation key function changing unit for changing the functions of the plurality of keys.

20 Claims, 23 Drawing Sheets

Fig.4
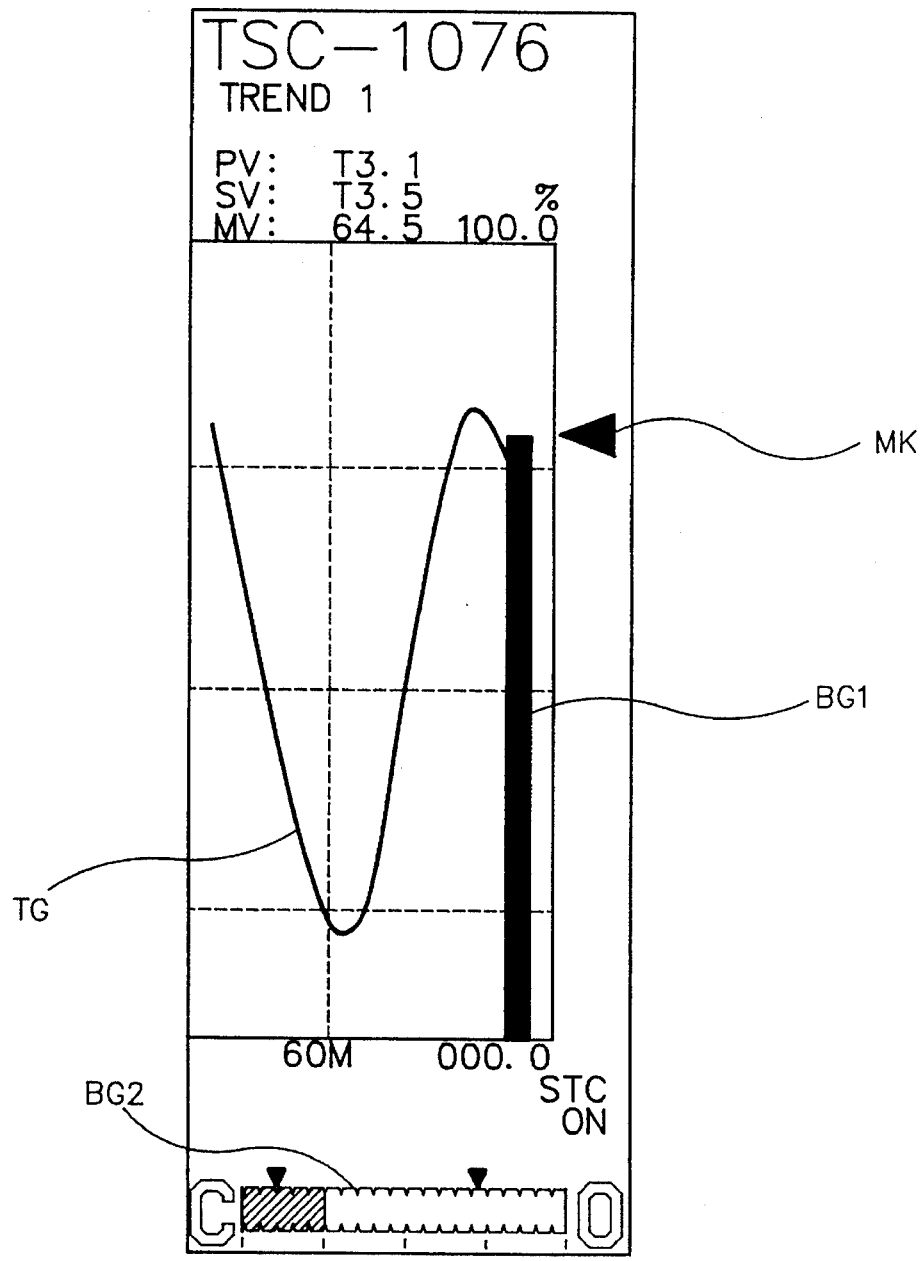
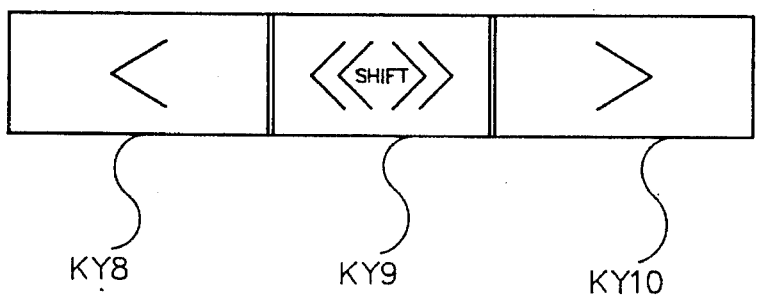

Fig.5
```
TIC-1076
PID 1
PB1         450.0
MODE         MAN
STC1         OFF
PV1         10.0
SV1         40.5
MV1        100.0
DV1          0.5
CSV1       100.0
FF1        100.0
TRK         50.0
PB1        450.0
TI1         1000
TD1            3
SFA1       0.570
SFB1       0.123
GW1          1.0
GG1        1.000
PH1        106.3
PL1          6.3
DL1        100.0
VL1        100.0
VT1            1
MH1         60.0
ML1         90.0
MR1       100.0%
RB1        60.0%
PMV       100.0%
```
 — KY1
 — KY2
 — KY3
 — KY4
 — KY5
 — KY6

Fig. 8
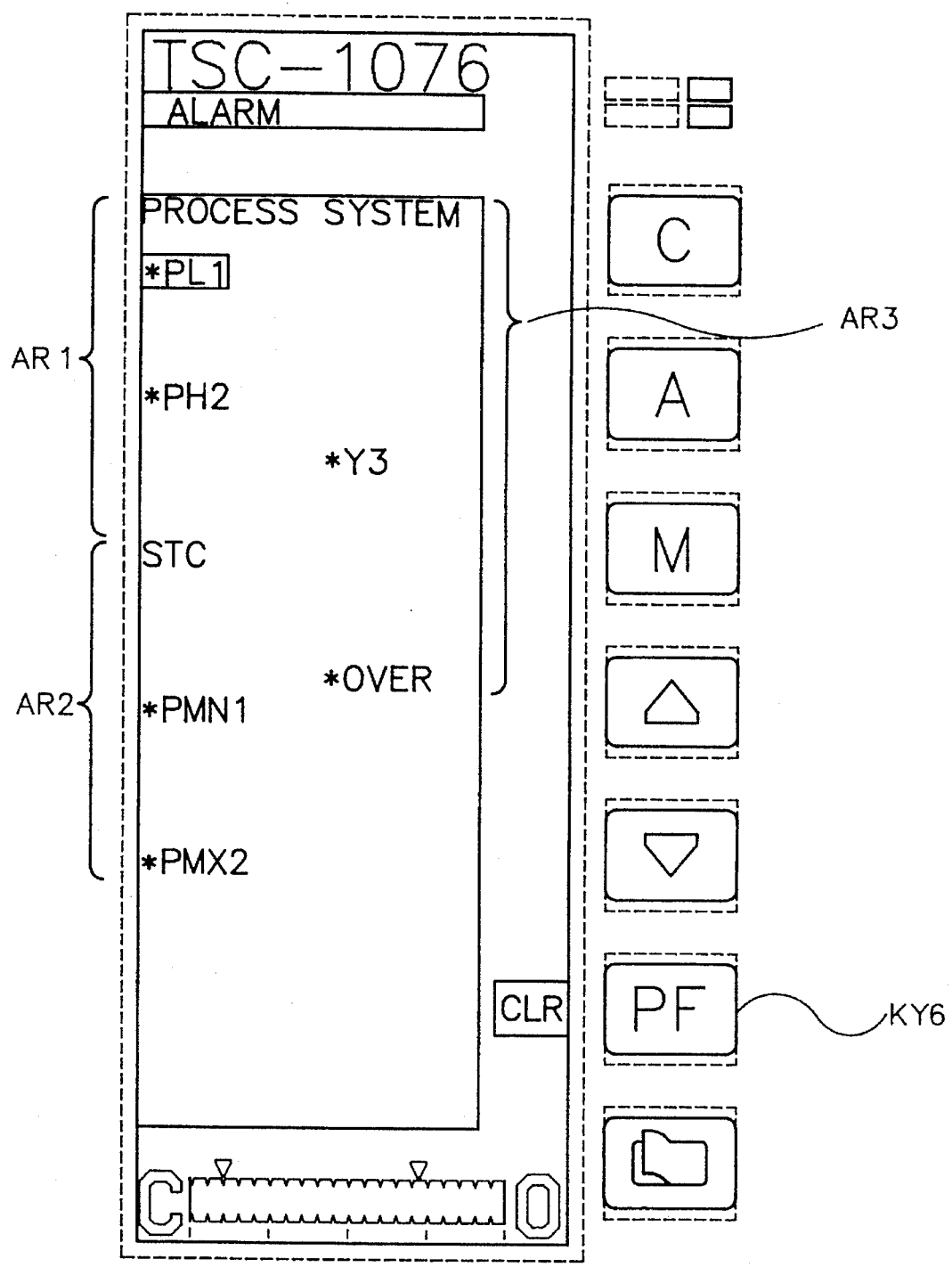
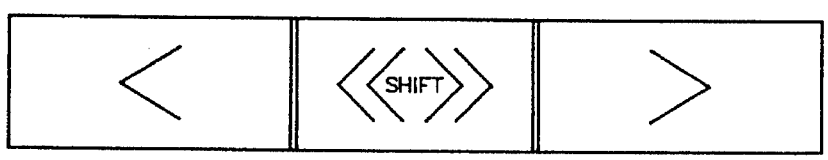

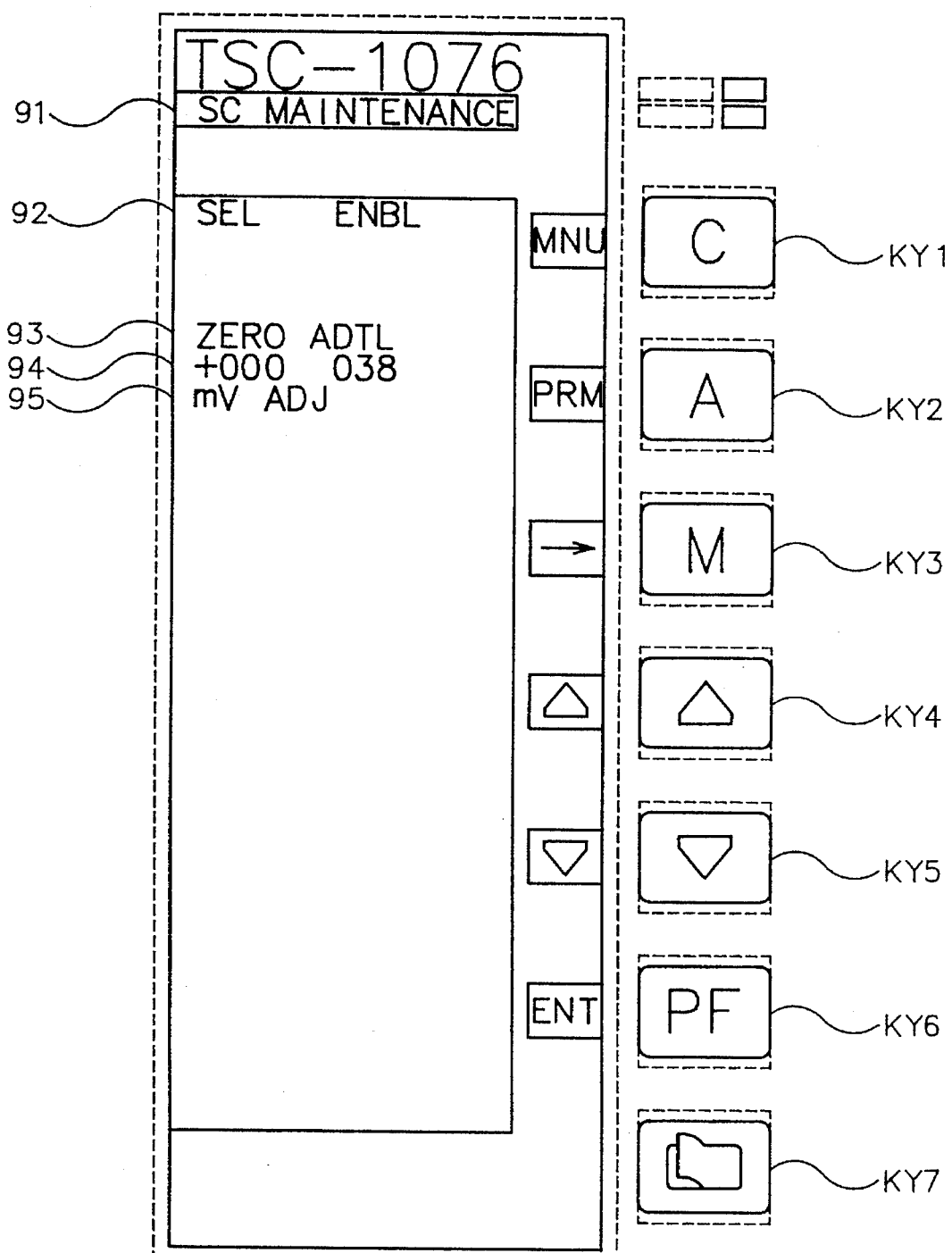
Fig.9
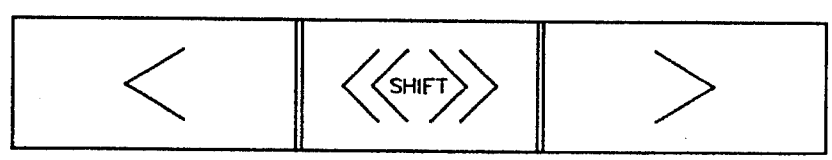

Fig. 14
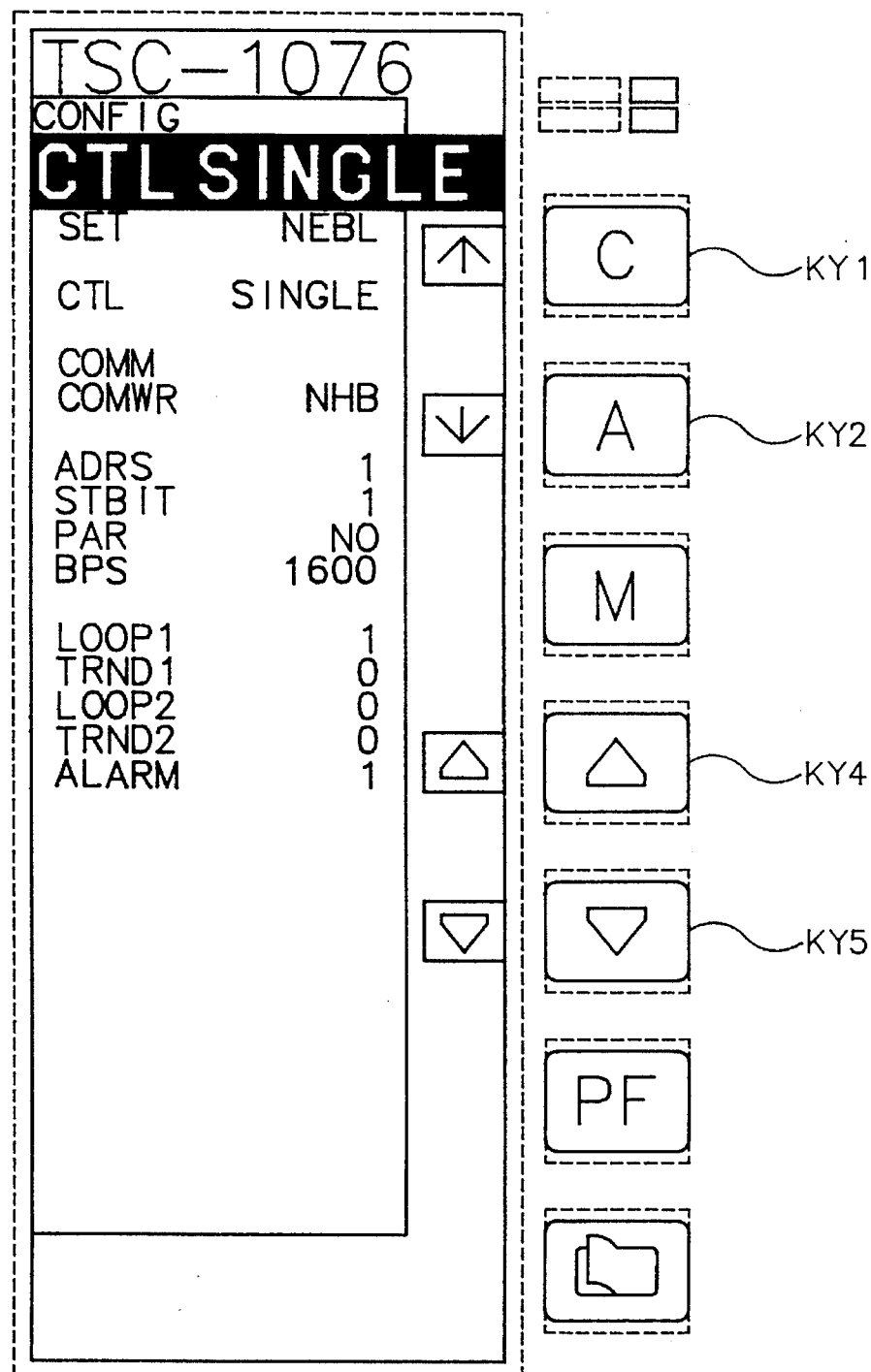
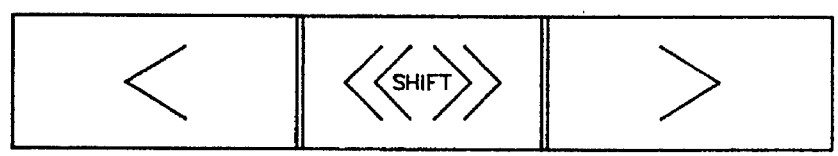

CONTROLLER INCLUDING MULTIFUNCTIONS

This is a continuation application of Ser. No. 07/932,977, filed Aug. 20, 1992, now abandoned.

BACKGROUND OF THE INVENTION

1. Field of Invention

This invention relates to a controller used to control processes; and more particularly, to a controller which has a high-grade function and a better man to machine interface function; which uses a full dot type display unit as a front operation panel on which a variety of control operation information can be selectively displayed; which is capable of selecting various control operations and panels in response to signals from operation keys; and which is capable of setting various parameters.

2. Description of the Prior Art

Conventionally, a single loop controller, equipped with a microprocessor, has been widely used in the field of process control. The single loop controller has certain advantages, such as a light engineering load, and a better operability, as compared to the distribution type control system (sometimes referred to as "DCS").

An example of such single loop controller is disclosed, for example, in Japanese Patent No. 57/57721 (1982), wherein the indicators for displaying information, such as process volume PV, set value SV, and control output MV, required to control the various functions, the operation keys for changing the set values, the operation keys for changing control modes, such as automatic control mode, and manual control mode, are arranged on the front panel, whereas the setting means for setting various parameters used to control calculations, for designating various functions, and for correction calculations, are provided on the side surface of the single loop controller.

Although such a conventional controller is capable of maintaining operability similar to the analog controller, there are problems with such conventional controller, such as, the measuring instruments must be removed from a rack, and the setting means, provided on the sides of the measuring instrument, must be operated so as to set the various parameters. Furthermore, since only a minimum number of indicators and operation keys, required to perform the control functions, has been provided on the front panel, the information required for other control operations, such as, the trend information for the process volume PV, must be recorded by use of a separate recorder.

Accordingly, it is evident that the prior art needs improvement.

SUMMARY OF THE INVENTION

An object of the invention is to overcome and resolve the foregoing and other deficiencies and disadvantages of the prior art.

Another object is to provide a controller having better operability with a minimum number of operation keys on the front panel, and which is capable of displaying with a simple key operation, various information, such as trend of process volume PV, and information used to set various control parameters of the controller.

Still another object is to provide a controller, which, by utilizing the same hardware, is capable of easily selecting and executing (a) a function as a single loop controller in which a single control loop is executed by a single controller, (b) a function as a cascade controller, (c) a function as a selector controller, and (d) a function as a program controller.

A further object is to provide a controller which has high reliability, is capable of readily performing backup operation, even when malfunction occurs in the control calculating means, and has display controlling means for controlling displays of various information.

A still further object is to provide a controller which can be easily adjusted, and into which can be readily inputted sensor signals derived from various sensors in the field.

BRIEF DESCRIPTION OF THE DRAWINGS

FIG. 4 is a pictorial view depicting a trend graph panel and various functions assigned to the operation keys.

FIG. 5 is a pictorial view depicting a tuning panel and various functions assigned to the operation keys.

FIG. 8 is a pictorial view depicting an alarm panel and various functions assigned to the operation keys.

FIG. 9 is a pictorial view depicting an engineering panel of a signal conditioner.

FIG. 14 is a pictorial view depicting an engineering panel.

DESCRIPTION OF THE PREFERRED EMBODIMENTS

Figure 1:
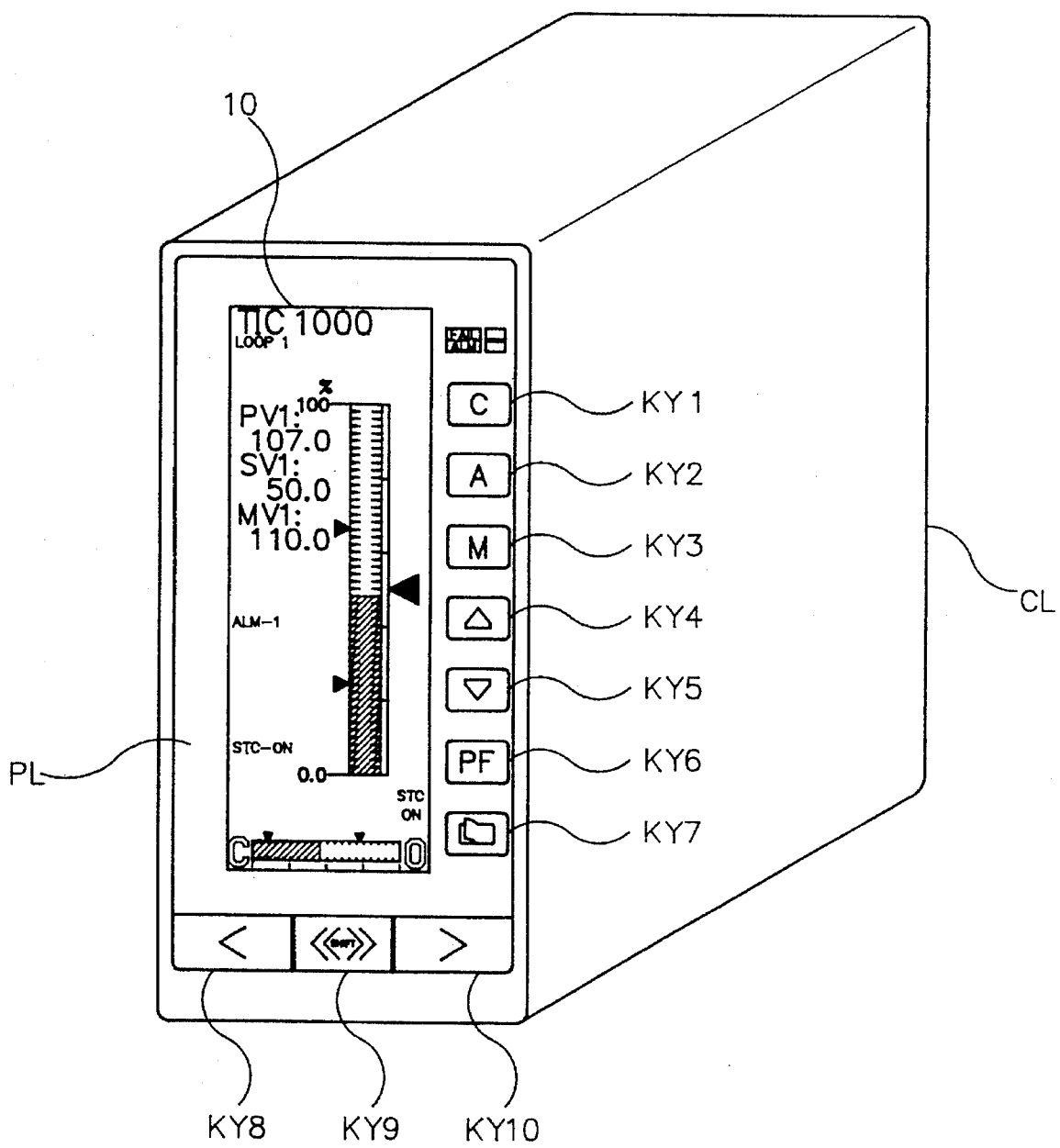
FIG. 1 is a perspective front view of an illustrative embodiment of the invention.

FIG. 1 shows the outside of the invention, comprising a main body CL of the controller, and a front panel PL. In front panel PL, there are provided, for example, a full-dot type liquid crystal display device 10, and a plurality of operation keys KY8–KY10 which are aligned along a lower part of display device 10.

Display device 10 may comprise a cathode ray tube (CRT) which displays both characters and figures, as well as various symbols, in any desired format. The respective operation keys are arranged as, for example, depression buttom switches.

The side surfaces of the controller of the invention do not have any keys, displays or switches, in contrast to the prior art. Accordingly, the invention has a very attractive appearance.

Figure 2:
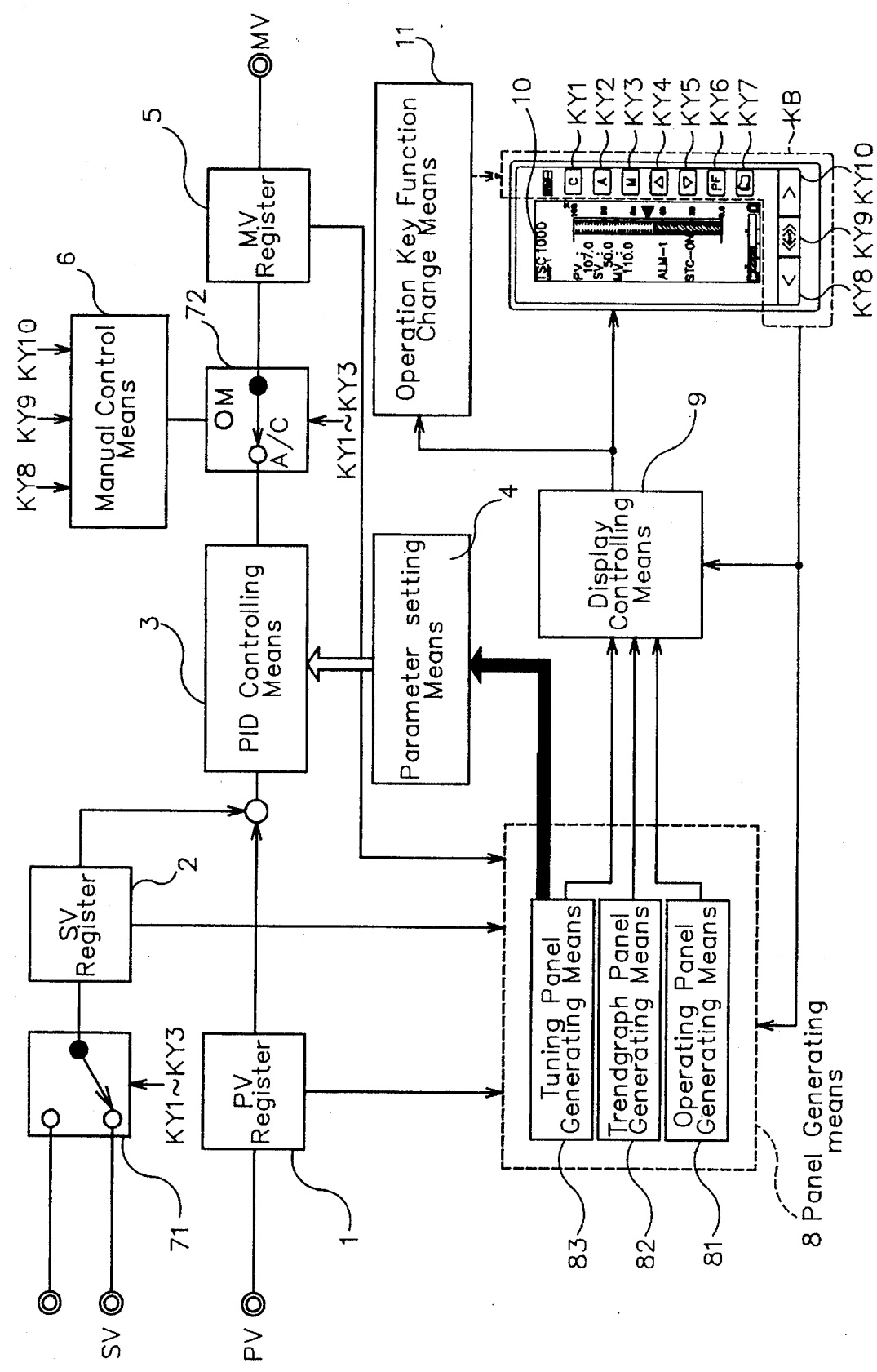
FIG. 2 is a schematic block diagram depicting the circuit arrangement of a first illustrative embodiment of the invention.

FIG. 2 shows a measurement value register 1 for storing the process value PV, which is the measurement value; a set value register 2 for storing the set value SV; a control calculation unit 3, which may be the PID controlling means, for performing control calculation on the PID of a deviation or difference between the measurement value PV and the set value SV; a parameter setting means 4, including a register into which various parameters such as PID used in the control calculation unit 3 are disposed, for setting the PID parameter, or the like, into control calculation unit 3; and an output register 5 for storing a control output MV calculated in control calculation unit 3. It should be noted that any one or more of the foregoing functions can be realized by use of software installed in a microprocessor.

The controller further comprises a manual control means 6 for manually controlling the control output MV, which is arranged in such a manner that a manual output can be controlled in response to instructions given by operation of keys KY8–KY10, and which becomes effective in the manual mode; and switches 71,72 for changing the operation modes, which are arranged in such a manner that the operatin mode which is selected may be the automatic or manual operation mode as selected by an external computer, for example, or in response to instructions from keys KY1–KY 3, as will be described hereinbelow. These arrangements are similar to conventional controllers in terms of desired results but differ in the actual practice of the intermediate steps and in the use of a microprocessor.

The controller further comprises a display device 10 which is shown in FIG. 1, and which is provided on the front panel of the controller; and an operation keyboard KB positioned around display device 10 and on which a plurality of keys KY1–KY10 are used. Key KY7 is assigned the function of a panel expansion key for instructing the panel expansion to be displayed on display device 10.

The controller further comprises a panel generating means 8 for generating various panels to be displayed on display device 10. Measurement value PV, set value SV, and control output MV are inputted to panel generating means 8, and are signals from keyboard KB. Panel generating means 8 comprises an operating panel generating means 81 which generates an operating panel, wherein the values of measurement value PV and control output MV are displaed as bar graphs on display device 10 when the value of set value SV is related to the value of measurement value PV. The panel generating means 8 further comprises a trend graph panel generating means 82 for displaying the trend of measurement value PV on display device 10 as a trend graph. The panel generating means 8 also comprises a tuning panel generating means 83 for adjusting and setting various control calculating panels to be displayed on display device 10 and to be set to control calculation means 3.

The controller further comprises a display controller means 9 for controlling the panel display and panel expansion on display device 10. Display controlling means 9 controls the panel expansion in such a manner that upon receipt of the signal, issued from panel expansion key KY7, the operating panel formed by the operating panel generating means 81 and the trend graph panel formed by the trend graph panel generating means 82, are displayed on display device 10. When a signal from panel expansion key KY7 and a signal from, for example, a specific operating key KY9, independent from panel expansion key KY7, are received at the same time, the tuning panel , produced by the tuning panel generating means 83, is displayed on display device 10.

The controller further comprises an operation key function change means 11 for changing the functions of the plurality of keys KY1–KY 10, when for example, display controlling means 9 signals panel expansion on display device 10. Operation key function change means 11 is arranged in such a manner that when an operating panel is displayed on display device 10, the respective operation keys KY1–KY6 function as operation keys for changing either the control mode, or the set value; and when a tuning panel is displayed, operation keys KY1–KY6 function as keys for selecting a parameter, or setting the parameter value.

Figure 3:
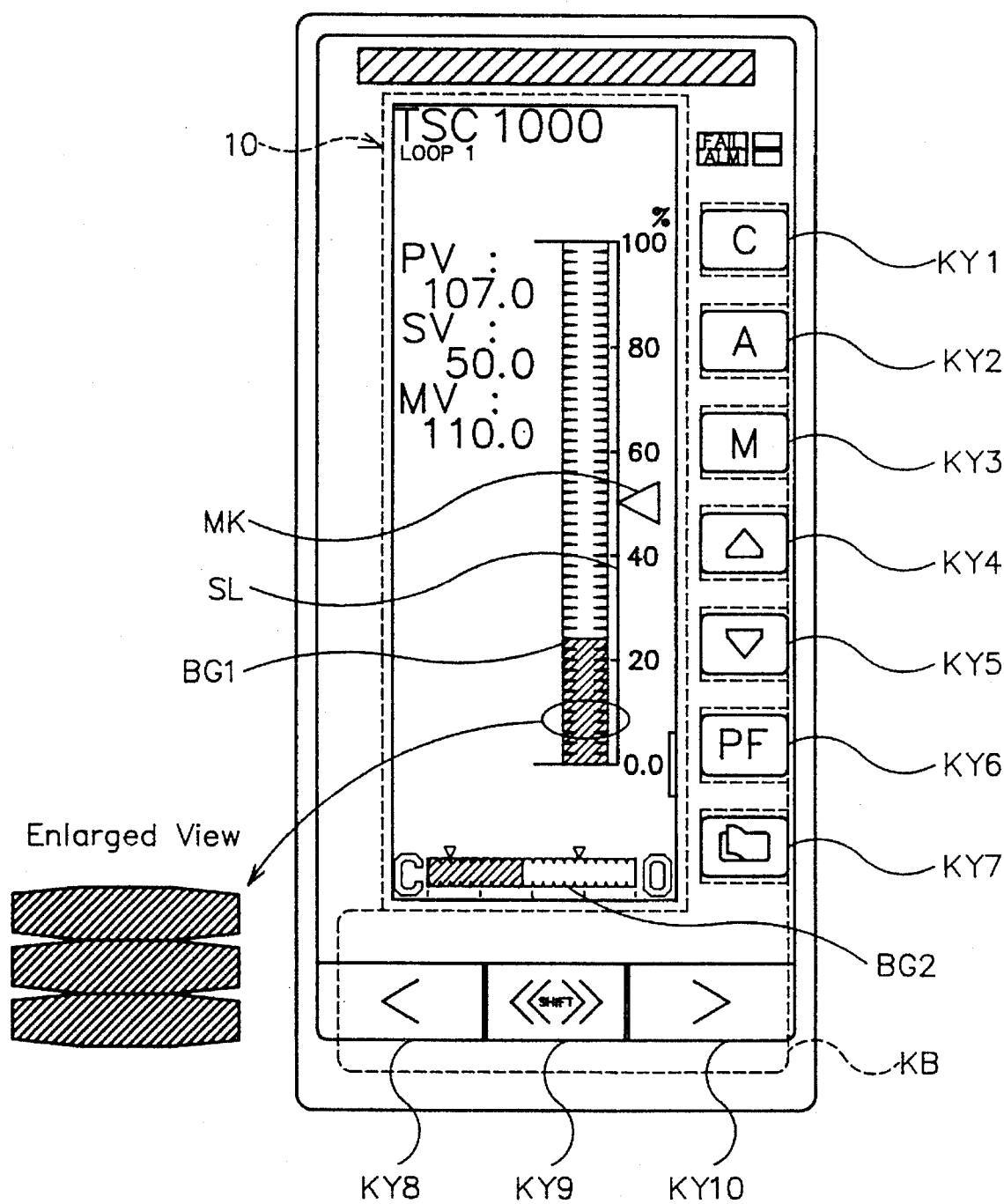
FIG. 3 is a pictorial view depicting an operation panel and various functions assigned to the operation keys.

FIG. 3 shows various functions assigned to the different keys when an operating panel is generated by operating panel generating means 81 and displayed by display device 10.

The operating panel, displayed on the display device 10, is such that measurement value PV is displayed as a bar graph BG1, near the center of the panel, which is expanded or contracted along a vertical (i.e. up and down in the figure) direction in response to the measurement value, and the control output PV is expressed as a bar graph BG2 shown at the lower part of the panel, and which is expanded or contracted along a horizontal direction (i.e. left or right in the figure), depending on the value of the control value. It should be noted that, as shown in the "enlarged view", the shape of the bar graphs are so formed that the concave-convex portions are aligned at a preselected pitch along the expansion and compression direction. As a result, it is easy to recognize when the length of a tip portion of the bar graph is changed even slightly.

With respect to the bar graph BG2, indicative of the control output MV, a symbol C indicated at a left side of the panel signifies that the control output MV becomes small and, for example, the valve is closed. Also, symbol O indicated at the right side of the panel signifies the direction along which the valve is opened. Also, set value SV is indicated by a triangular shaped indicator mark MK in relation to the same scale of the bar graph BG1 representative of measurement valu PV. The position of indicator mark MK is moved in the vertical direction along scale. SL in conjunction with changes in the set value, such as resulting from operation of keys KY4,and KY5. Such a display condition is simulated as a front panel plane, or a measuring device plane, of a conventional controller. Therefore, advantageously, when control operating conditions are being monitored and operated, the invention provides no sense of incongruity to an operator who is accostomed to a conventional controller.

The PV value, SV value, MV value are displayed within the operating panel also as digital values. At the upper part of the panel, there is displayed a tag number (TSC-1,000) attached to a control loop assigned to the controller. In accordance with such an operating panel, when an operator monitors the operating panel at a location which is remote from the controller, the PV value, SV value, MV value corresponding to the major data can be understood from their analog representations (i.e bar graph) and when the operator physically approaches closer to the controller, the numerical values of the data can be readily understood from their digital representations.

In keyboard KB, of FIG. 2, the functions for changing the operation modes have been assigned to keys KY1–KY3, and switch means 71 and 72 are driven in response to the signals issued from the keys KY1–KY3. That is, when key KY1 is depressed, set value SV is applied from an external computer to set such an external computer operation mode that the control operation is carried out. When key KY2 is depressed, an automatic operation mode is set, so that the control operation is performed by solely this computer. When key KY3 is depressed, a numeral control mode is set so that control output MV can be manually controlled.

Keys KY4 and KY5 have assigned thereto the functions of setting the set value SV. The value of set value register 2 can be varied by depressing these keys. The value of the set value register 2 can be recognized as the position of set value mark MK of display device 10.

Keys KY8–KY10 have assigned thereto the functions of changing control output MV when the manual control mode is selected. In other words, when manual control mode is selected, the signals derived from depressing these keys are applied to manual controlling means 6. In the embodiment, control output MV is decreased when key KY8 is depressed, whereas control output MV is increased when key KY10 is depressed. Also, when both keys KY8 or KY10, and key KY9, which has assigned thereto the function of increasing speed, are simultaneously depressed, either the increasing speed or decreasing speed of control output MV is emphasized so that a desired control output value can be quickly achieved.

FIG. 4 shows a panel, formed by trend graph panel generating means 82 and which would be displayed on display device 10, and the respective functions assigned to the respective keys KY8–KY10 when the trend panel is displayed.

In the trend graph panel of FIG. 4, measurement value PV of the control loop loaded by the controller is displayed in such a manner that the past data measured from 48 hours prior to the current measurement time at a maximum up to the current measurement time are displayed as a trend graph TG. Both the current data and the set value SV are displayed at the latest time position of the trend graph as a vertical bar graph BG1 and the set value indicating mark MK. Such a trend graph is useful when it is desired to observe the process behavior at different times, such as at start up time, during stable operation, and during unattended operation time , such as at night and on weekends. For example, sudden changes occurring in the data within a short time period can be also recognized by recording in bar graph form both the maximum value and minimum value of the process value PV occurring within a predetermined recording period.

At the lower part of the panel, control output MV is represented as a horizontal bar graph BG2 in such a manner that the bar graph BG2 is expanded or contracted along the horizontal direction thereof, depending on the values of control output MV. The trend graph panel bar graph representation is similar to that of the operation panel. At the upper part of the panel, PV value, SV value and MV value at the present time, are displayed as digital values.

Keys KY1–KY10 (note KY1–KY7 are omitted hereat) have assigned thereto functions similar to those shown for the operation panel of FIG. 3. As an example, the functions for expanding and contracting or compressing the range in the amplitude direction may be assigned to keys KY4 and KY5.

FIG. 5 depicts a tuning panel generated by tuning panel generating means 83 to be displayed on display device 10, and various functions assigned to the keys when this tuning panel is displayed. As the tuning element in the controller, there are, for example, tuning of the PID calculation parameter, and self tuning of the PID calculation parameter (often called the "STC"). In the embodiment, the tuning panel displays such PID calculation parameter. The tuning panel is selected from a tuning panel menu, which may be first displayed on the display device 10 prior to the display of the selected tuning panel.

In the tuning panel of the PID calculation parameter, a large number of parameters related to the PID calculation parameter are displayed at the same time, and both of the set items and the parameter set values thereof are displayed on the enlarged window appearing at the upper part of the panel. As a result, the desired parameter can be set, while observing a mutual relationship between a parameter to be set and the other parameters.

Symbols indicative of the functions assigned to the keys are displayed at positions corresponding to the keys at the right side of the panel. For example, keys KY1 and KY2 control the up down movement of the cursor. Key KY3 performs the function of a "save" key. Key KY4 and key KY5 control the increasing and decreasing of the parameter set values. Key KY6 functions as a change key.

It should be noted that change key KY6 has the function of monitoring the operation panel, or the trend graph panel (that is the panel which has been displayed before the tuning panel is displayed) when key KY6 is depressed, and continues to be depressed. By using such a change key, the value of the parameter may be changed or controlled while displaying and monitoring either the operation panel or the trend graph panel on the screen of the display device 10, and together with the tuning results displayed on the same screen of the display device 10.

When the panel on display device 10 is extended into the tuning panel, the functions of the respective keys are changed by the operation key function changing means 11 into such functions corresponding to those displayed on display device 10.

In the tuning panel, an item to be set is selected by moving the cursor using keys KY1 and KY2. The item selected at this time is displayed on the enlarged window positioned at the upper part of the panel. It is in an enlarged display form for easy observation. In this example, a condition representing a proportional band PB1 has been used.

Subsequently, the value of the parameter (450.0 in the example) is increased, or decreased so as to be varied into a desired value by operating key KY4 or KY5. Although such a set parameter value per se is useful, this parameter value is stored in a non-volatile memory contained in parameter setting means 4 by operation key KY3, i.e. the "save" key.

Figure 6:
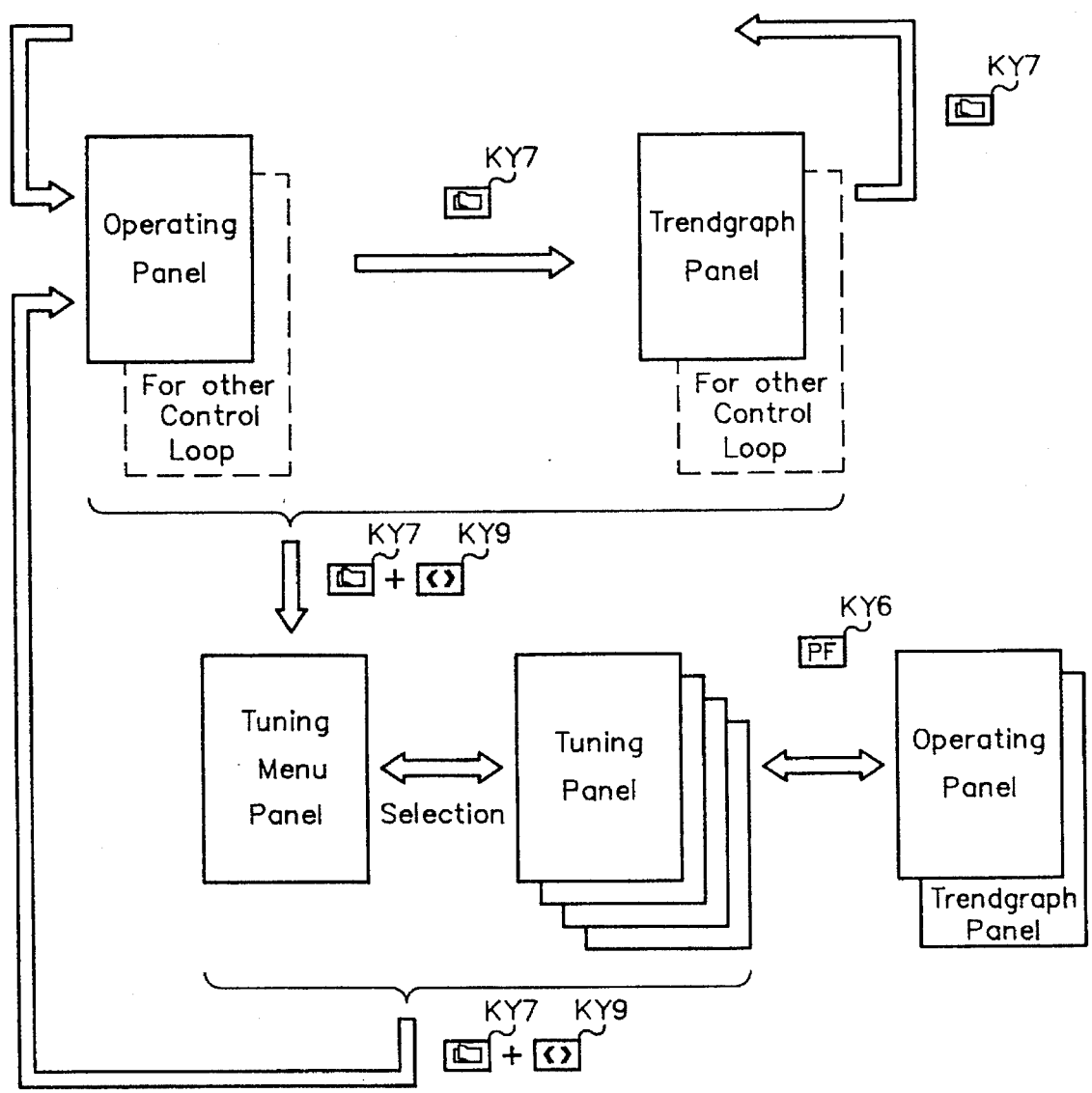
FIG. 6 is a diagram used to explain expansion of various panels in the embodiment of FIG. 2.

FIG. 6 illustrates expansion of a panel. What is meant by such term is that the panel which is displayed on the display device is changed, for example, from an operating panel to a trend graph panel, etc, as desired. The operating panel shown in FIG. 3 is displayed as a standard panel on display device 10. With the operating panel being displayed, when panel expanding key KY7 is operated, the trend graph panel, shown in FIG. 5, is displayed. If the panel expanding key KY7 is again operated with the trend graph panel being displayed, the display is returned to the operating panel. In this example, the controller controls one control loop. In case a plurality of control loops are controlled by the controller in parallel, it is so arranged that operating panels and trend graph panels can be displayed as shown by the dotted line with respect to the other control loops.

When panel expanding key KY7 and speed increasing key KY9 are simultaneously depressed with either the operating panel or the trend graph panel being displayed, as shown in FIG. 6, a tuning menu panel is displayed on display device 6 from which a particular tuning panel may be selected for display or expansion. If the tuning panel of the PID calculation parameter, for example, is designated, the panel shown in FIG. 5 is displayed. The tuning menu panel may have 6 items from which any particular tuning panel may be selected by assigning a particular tuning panel to a particular key KY1–KY6 as soft keys.

When change key KY6 is depressed with the tuning panel being displayed, either the operating panel, or the trend graph panel will be displayed while the change key KY6 is depressed. Whether the operating panel, or the trend graph panel is displayed when change key KY6 is depressed, is determined by which panel was displayed just before the operation is transferred into the tuning menu panel. For example, if the panel was expanded (that is one panel is changed to another on the display device) from the operating panel to the tuning panel, when change key KY6 is depressed, the operating panel will again be displayed. Then, when the change key KY6 is released, the displayed panel is returned to the original tuning panel.

When both the panel expanding key KY7 and the speed increasing key KY9 are depressed at the same time with the tuning panel being displayed, the displayed panel is returned to either the operating panel, or the trend graph panel, and then, even after the keys are released, one selected panel will remain on display.

Figure 7:
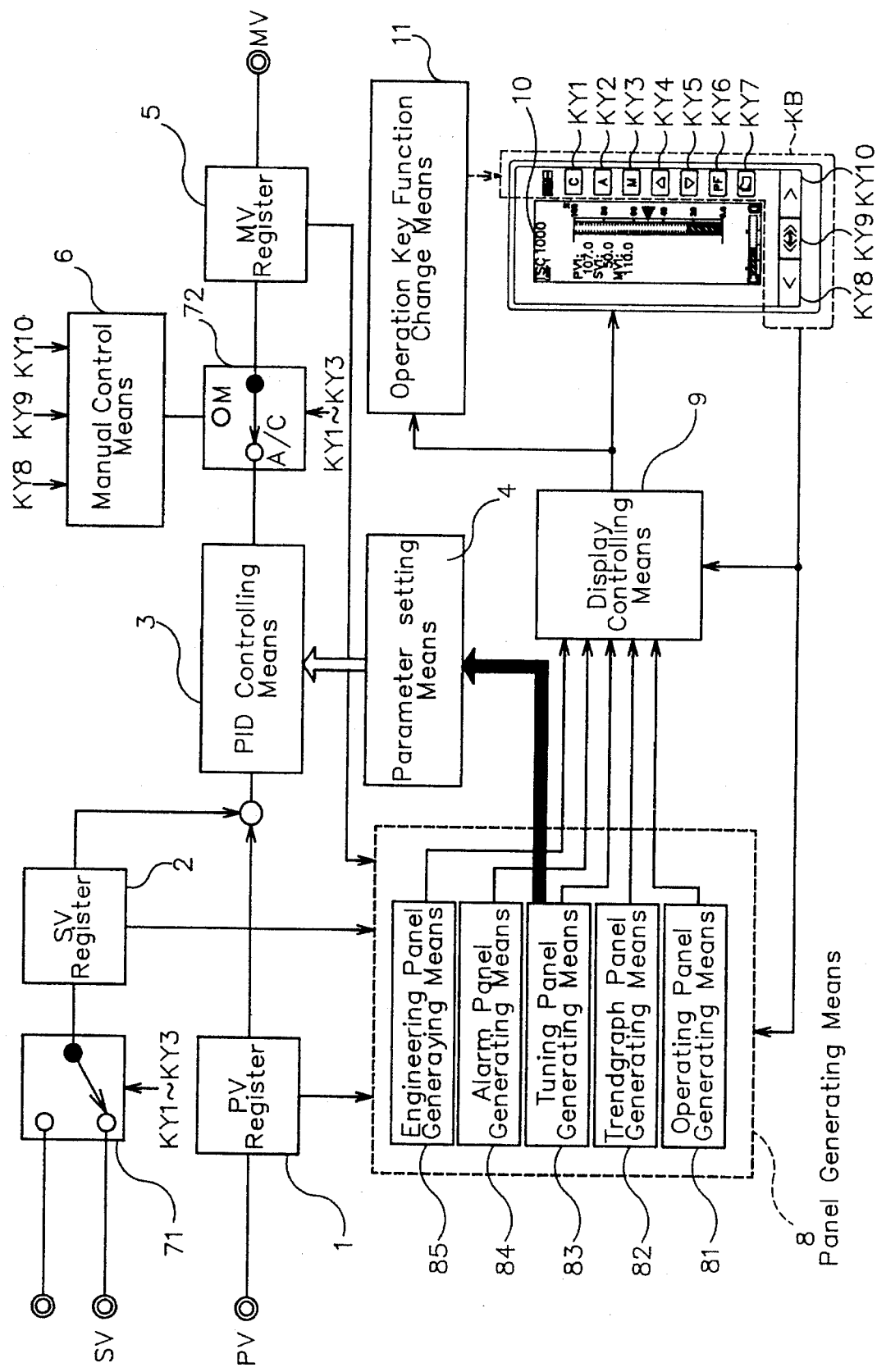
FIG. 7 is a schematic block diagram depicting the circuit diagram arrangement of a second illustrative embodiment of the invention.

FIG. 7 shows a second illustrative controller which differs from the first illustrative embodiment in at least the following respects. The panel generating means 8 further comprises an alarm panel generating means 84 for displaying in an alarm panel various alarm information at the same level as that of the operating panel, or the trend graph panel, and an engineering panel generating means 85 which is, for example, used in selection of a function of the controller, in setting of an input range, and in setting of a communication functional level which is lower than the level of the tuning panel.

FIG. 8 depicts an example of an alarm panel generated by alarm panel generating means 84 and to be displayed on display device 10 and various functions assigned to the keys when the alarm panel is displayed. The alarm panel is extendible from, for example, the trend graph panel by operating panel expanding key KY6.

The controller is equipped with various functions so that monitoring is performed whether or not, for example, the process value PV exceeds a certain upper limit value and a certain lower limit value, so that another monitoring is performed whether or not the parameters are correctly tuned when the PID calculation parameter is self tuned, and so that a system moninitoring is performed whether or not the operation of the controller per se is correctly executed.

The alarm panel corresponds to a panel used to recognize and confirm the monitored results and is arranged by a process alarm display region AR1, a self tuning error display region AR2, and a system alarm region AR3 and the like.

At a position corresponding to key KY6, located near the right lower part of the panel, symbol CLR represents a "clear" function assigned to key KY6.

Alarm items corresponding thereto are displayed on the respective alarm regions. It should be noted that item "PL1", which is displayed in the reverse form, denotes an item presently occurring. The item which is displayed in the non-inverting form, represents an item which occurred in the past. A mark * displayed on a head portion of each item denotes a mark used for requesting confirmation by the operator. When key KY6 assigned to the "clear" function is operated, t signifies that an alarm to occur has been confirmed, and then, mark * disappears from the screen.

FIG. 9 depicts an example of an engineering panel generated by engineering panel generating means 85 to be displayed on display device 10, and various functions assigned to the keys when the panel is displayed. When panel expanding key KY6 and speed increasing key KY9 are operated simultaneously , with the tuning panel being displayed, a menu panel, used for selecting a particular engineering panel, is displayed. From the menu panel, the engineering panel shown in FIG. 9 is selected.

In FIG. 9, there is shown a signal conditioning panel used for setting types, ranges, and the like, of sensor input coupled to the controller. Normally, the engineering panels are used prior to the start of operation by the controller, and is set so that the control calculation is interrupted. As a result, no bar graph display indicative of the control output MV, used to monitor the process, is displayed on the signal conditoning panel. Also, in the panel, the set values are automatically saved in a memory used in the controller at the same time that the setting operation is carried out. The function of a "save" key has not been assigned to any particular key, although such assignment can be made.

The depicted engineering panel corresponds to an example of a panel used to perform engineering of a signal conditioner, wherein are shown a panel title 91, representation 92 of whether or not a setting operation is available, and a title 93 of a setting item. In this case, the title of an item for adjusting the zero point is displayed. The panel also shows data 94, and a unit 95. Key KY1 is assigned the function of a menu key. Key KY2 is assigned the function of a parameter key. Key KY3 is assigned the function of a cursor key. Keys KY4 and KY5 are assigned the functions of increasing and decreasing the set value keys. Key KY6 is assigned the function of a set data writing key.

In the engineering panel, while the set data within the signal conditioner used in the signal input circuit of the controller is read so as to change this value, either the setting operatoin, or the operation command is performed. In the signal conditioner unit, the respective items are classified into two stages, such as the major item and the minor item, and may be successively read out by manipulating menu key KY1 and parameter key KY2 in such a manner that the pages of a book are successively turned over. By operating cursor key KY3, the read data are selected for each digit thereof, and the value of the read data is changed by operating the increasing and decreasing keys KY4 and KY5. When desired data is displayed, the data is written into the memory contained in the signal conditioner by operating operating write key KY6.

The data setting operation for the engineering panel is performed when the control calculation by the controller is stopped and the operation mode is brought into a non-operation mode. As a result, when the engineering panel is first displayed, or expanded, the words "SET INHIBIT" or the like, indicating that a data setting operation is impossible is displayed at representation 92 to indicate whether or not the data setting operation mode is available.

Under such condition, when cursor key KY3 is operated, the data setting condition is brought into "SET ENABLE", the control calculation is stopped, and the set data within the signal conditioner is read out.

Advantageously, a confidential password can be placed in the engineering panel so that the parameters within the engineering panel can be prevented from being changed without authorization. When a specific password, such as for example, a four digit number, is set, the password must be inputted when the parameters are to be varied with the engineering panel being opened.

Figure 10:
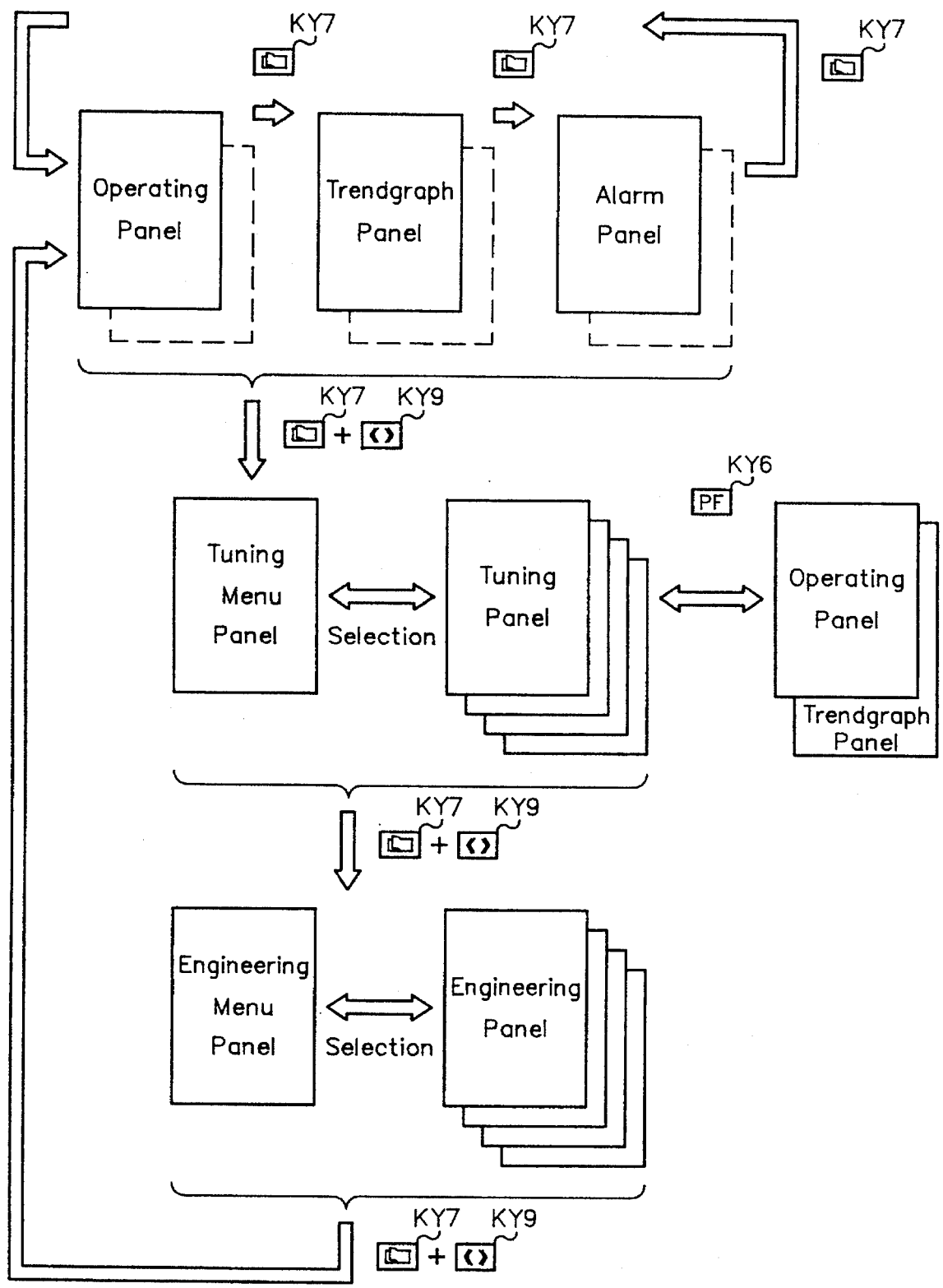
FIG. 10 is a diagram used to explain expansion of various panels in the embodiment of FIG. 7.

FIG. 10 shows expansion of panels for the embodiment of FIG. 7, wherein one difference between this example and that of FIG. 6, is that the alarm panel shown in FIG. 8 is displayed from the operating panel and the trend graph panel by operating the panel expanding key KY7. When both key KY7 and key KY9 are operated at the same time with the tuning panel being displayed, the tuning panel is expanded into the engineering panel shown in FIG. 9.

Advantageously, the invention controller has better operability so that the operation for control operation and setting operation for setting various parameters, can be performed with use of a limited number of keys. The various parameters can be set using the change key on the tuning panel, while confirming operating conditions of the control using the same display device.

Figure 11:
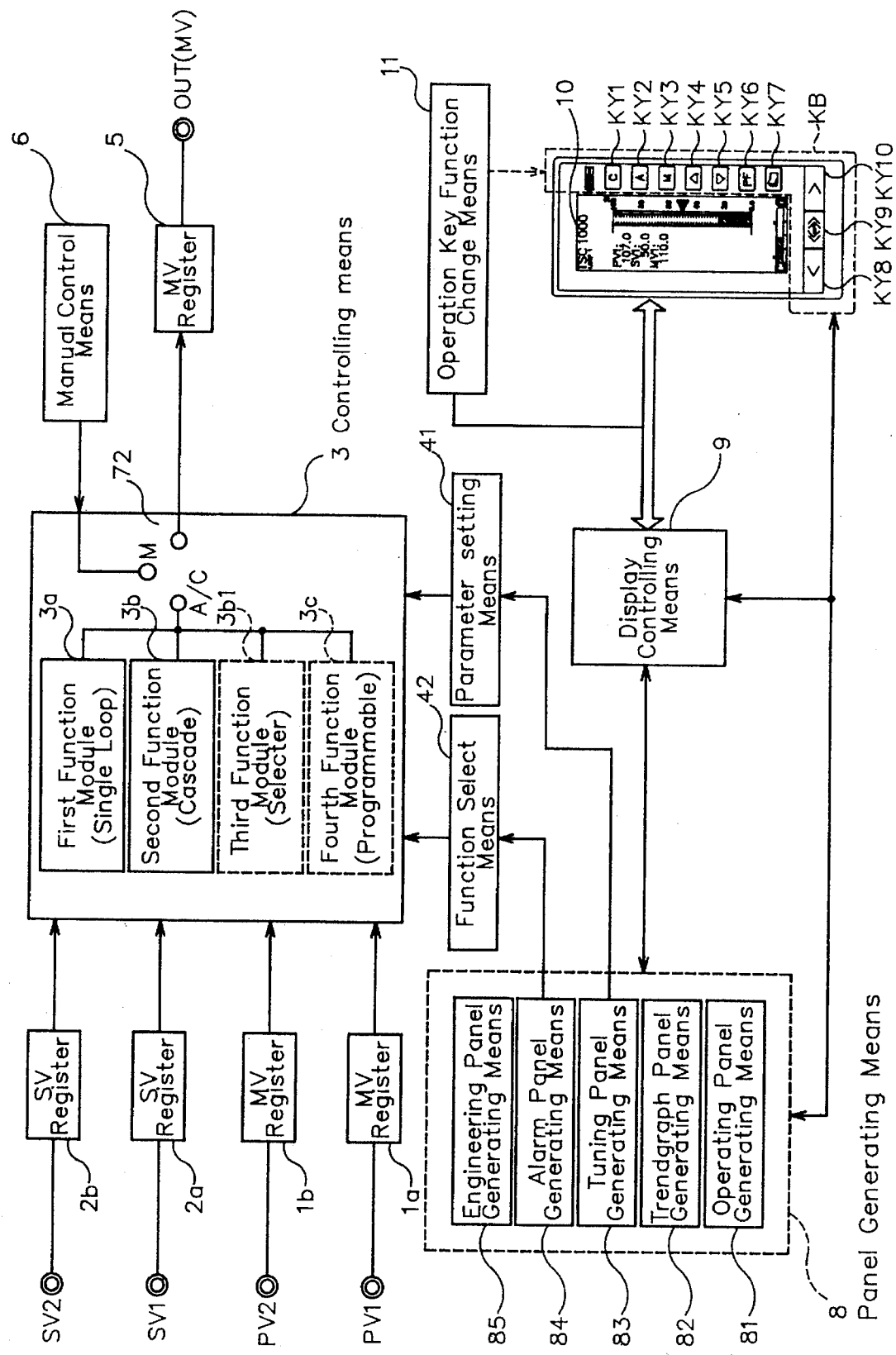
FIG. 11 is a schematic block diagram depicting the circuit arrangement of a third illustrative embodiment of the invention.

FIG. 11 depicts an invention controller comprising a first measurement value register 1a for storing a first process value , that is the measurement value, PV1; a second measurement value register 1b for storing a second process value, that is a measurement value, PV2; a first set value register 2a for storing a first set value SV1; a second set value register 2b for storing a second set value SV2; and controlling means 3 for performing a predetermined calculation on signals and for executing a control calculation, such as PID, on a deviation between the measurement value and the set value by inputting thereinto the measurement values PV1, PV2 stored in the first and second measurement value registers 1a and 1b, and also the set values stored in the first and second set value registers 2a, and 2b.

Controlling means 3 comprises a first function module 3a, which functions as a single loop controller to execute a single loop control with respect to a single control element, and a second function module 3b which functions as a cascade controller to perform cascade control by serially connecting two control elements.

A parameter setting means 41 includes a register for storing therein various parameters such as the PID used in the controlling means 3 and is used for setting the PID parameter in controlling means 3. A function selecting means 42 provides for selecting the first or second module. An output register 5 stores a control output (i.e. the operation amount) MV calculated in controlling means 3. The functions are realized by use of appropriate software installed in a microprocessor. A manual control means 6 is provided for manually controlling output MV, and is so constructed that means 6 is available in a manual mode, and then a manual output can be controlled in response to keys KY8–KY10.

A display controlling means 9 is provided for controlling a panel display (that is to control what is herein called panel expansion or changing which panel is displayed on the display device) to display device 10 by automatically rearranging various panels generated by panel generating means 8, and displays the rearranged panels on the display device 10 in response to signals from display expanding key KY7.

When the first function module 3a is selected by function selecting means 42, the controller functions ina single loop mode and panel rearrangement is performed by such a single loop controller, and when a signal from panel expanding key KY7 is received, and with respect to the first process value PV1, an operating panel generated by operating panel generating means 81, a trend graph panel generated by trend graph panel generating means 82, a tuning panel generated by tuning panel generating means 83, an alarm panel generated by alarm panel generating means 84, and an engineering panel generated by engineering panel generating means 85, and the like, are displayed on display device 10.

When the second function module 3b is selected by function selecting means 42, the controller is in a cascade controller mode, and the panel is rearranged by such cascade controller, and with respect to first process value PV1 and second process value PV2, upon receipt of the signal derived from panel expanding key KY7, an operating panel generated by operating panel generating means 81, a trend graph panel generated by trend graph panel generating mans 82, a tuning panel generated by tuning panel generating means 83, an alarm panel generated by alarm panel generating means 84, and an engineering panel generated by engineering panel generating means 85, and the like, are displayed on display device 10.

Figure 12:
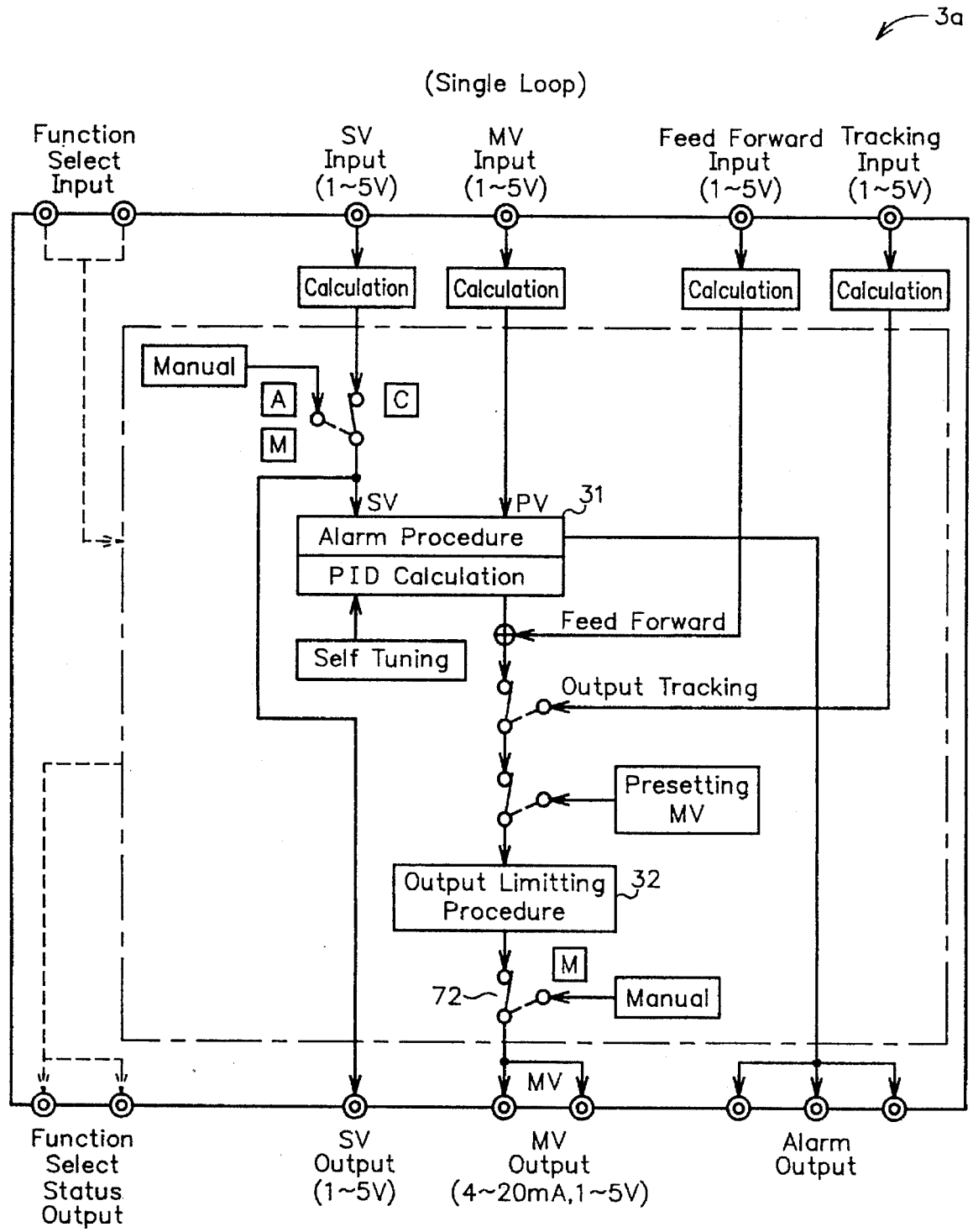
FIG. 12 is a schematic block diagram depicting the circuit arrangement of a first function module 3a used in the controller means of FIG. 11.

FIG. 12 shows first function module 3a comprising a control element 31 for performing an alarm process and a control calculation process to each of inputted first process value PV1 and inputted second process value PV2; and a limiting procedure element 32 for limiting the calculation result obtained at control element 31. First function module 3a is so arranged that the module functions as a single loop controller to perform, for example, the PID control calculation on the difference (or deviation) between first process value PV1 and first set value SV.

Figure 13:
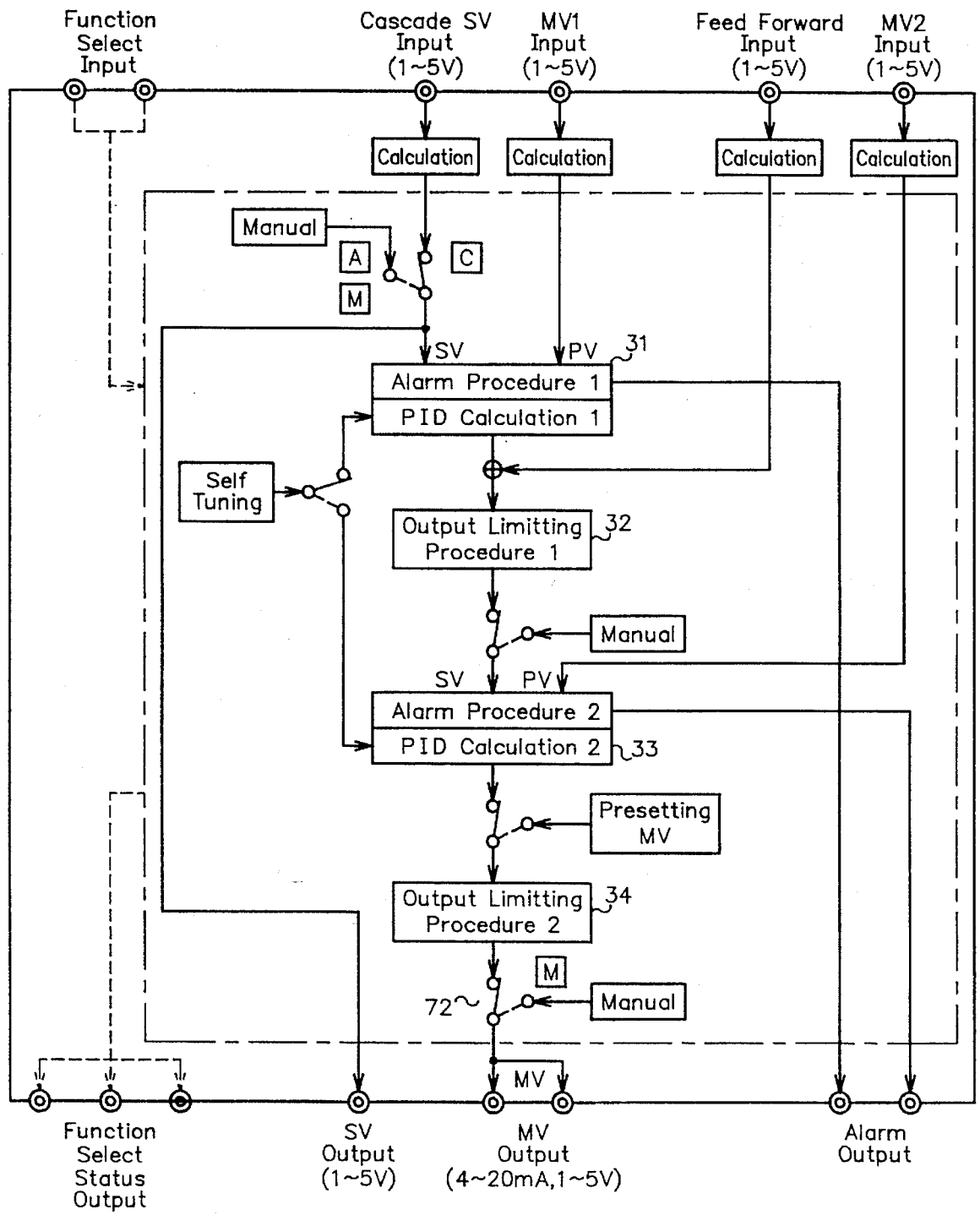
FIG. 13 is a schematic block diagram depicting the circuit arrangement of a second function module 3b used in the controller means of FIG. 11.

FIG. 13 shows second function module 3b comprising a limiting procedure element 32 for performing an output limiting procedure, and a control element 33 in which both second process value PV2 and the signal from control element 31 are supplied as set values via limiting procedure element 32. The two control elements 31,33 are series connected to each other to function as a cascade controller. A limiting procedure element 34 is provided for performing output limiting procedure on the calculation results of control element 33.

FIG. 14 shows an engineering panel, such as an environment setting panel, used to set the functions of controlling means 3 on the engineering panel generated by engineering panel generating means 85. In the panel, item CTL, which represents an item for selecting the function of the controller, is designated by keys KY1 and KY2. Keys KY1 and KY2 function as item selecting keys. A selection is made between first function module (SINGLE), or the second function module (CASCADE) by operating keys KY4 and KY5, which function as increasing and decreasing keys for data, so that the function selection is completed.

Other engineering or environmental settings than the function setting operation of the controller, for example, communication formatting, start mode function, ad way of displaying a panel, may be set by utilizing this engineering panel of FIG.

It should be noted that in this engineering panel the setting operation can be achieved without any substantial error, while the items or parameters designated by keys KY1 and KY2 are displayed in inverted form and also the item is displayed on the enlarged window, under the title of panel, in inverted form.

Figure 15:
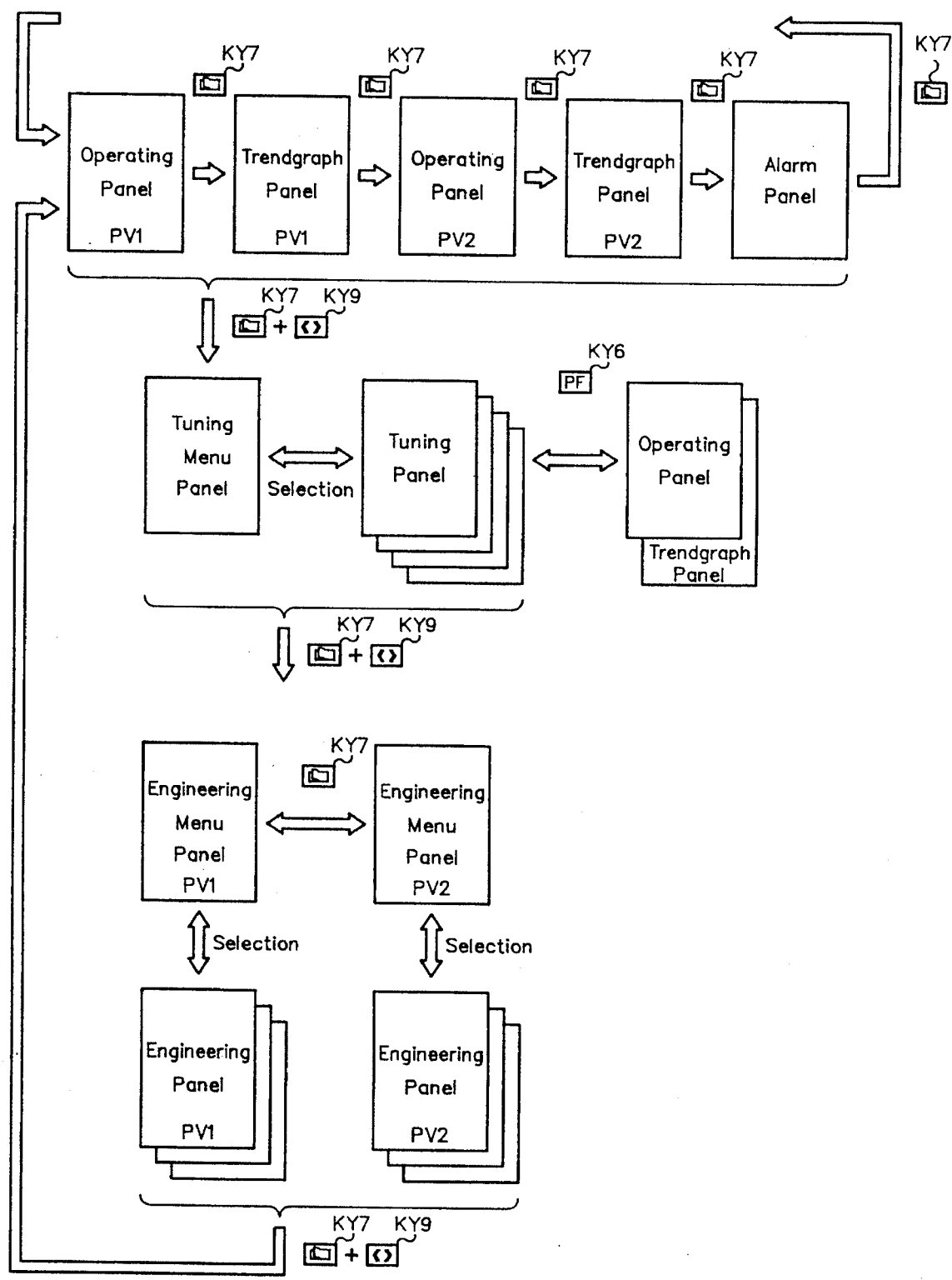
FIG. 15 is a diagram used to explain screen expansion effected when the second function module 3b is selected in FIG. 11.

When the first function module (SINGLE) is selected, a plurality of panels which have been produced by panel generating means 7 are rearranged by display controlling means 8, and a sequence for expanding the rearranged panels on display device 10, is shown in FIG. 15.

FIG. 15 shows one example of how the panels are rearranged when the second function module (CASCADE) is selected. Each time panel expanding key KY7 is depressed, the panel expansion order is as follows . . . operating panel for displaying PV1 . . . trend graph panel for handing the first process value PV1 . . . operating panel for displaying PV2 . . . trend graph panel for handing second process value PV2 . . . alarm panel . When panel expanding key KY7 and speed increasing key KY9 are depressed at the same time when the operating panels are displayed, a tuning menu panel used to select process values PV1 and PV2 is expanded into tuning panel shown in FIG. 5, and shown on display device 10. When, for example, a designation is made of the tuning panel of the PID calculation parameter, the present panel is expanded to the panel shown in FIG. 5. If the change key KY6 is depressed when the tuning panel is displayed, the operating panel is displayed while the key is depressed.

When the tuning panel is displayed, and panel expanding key KY7 and speed increasing key KY9 are simultaneously depressed, an engineering menu panel which is expanded into an engineering panel, such as shown in FIG. 14, is displayed on the display device 10. If the environment setting panel used to set the function is designated the present panel is expanded in the the panel shown in FIG. 14. When both panel expanding key KY7 and speed increasing key KY9 are depressed simultaneously while-the engineering panel is being displayed, the present panel is returned to the original operating panel.

As described, if either the first function module, or the second function module is selected in function selecting means 42, the panels displayed on display device 10 are automatically rearranged into the panels corresponding to the respective function modules and then processed by display controlling means 8 for display on the display device 10.

Figure 16:
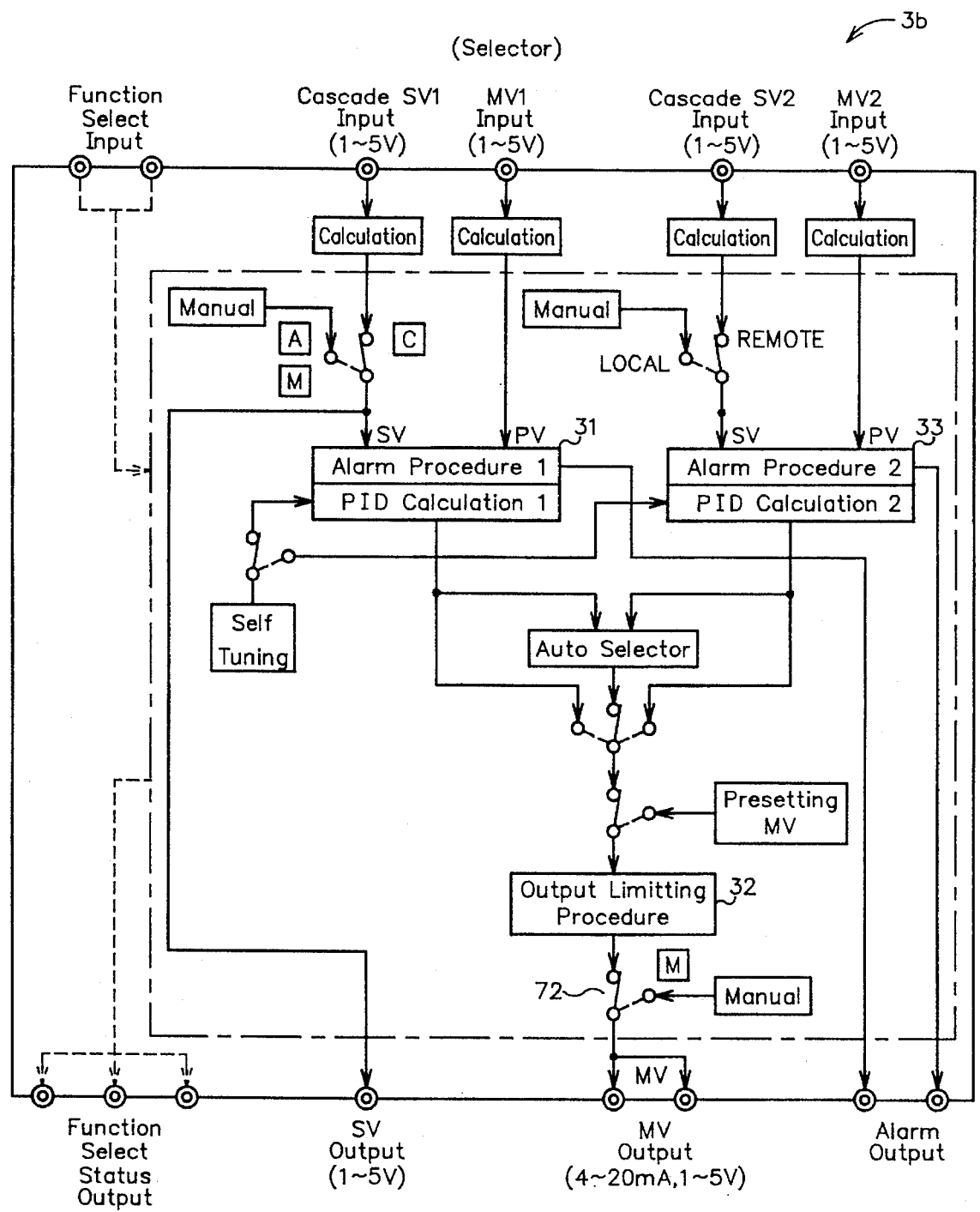
FIG. 16 is a schematic block diagram depicting the circuit arrangement of a third function module 3b1 used in the controller means of FIG. 11.

FIG. 16 shows a third function module 3b1, which serves as a selector function module in controlling means 3 of FIG. 11, wherein two control elements 31 and 33 are connected in parallel so as to function as a selector controller for executing auto-selector control.

Figure 17:
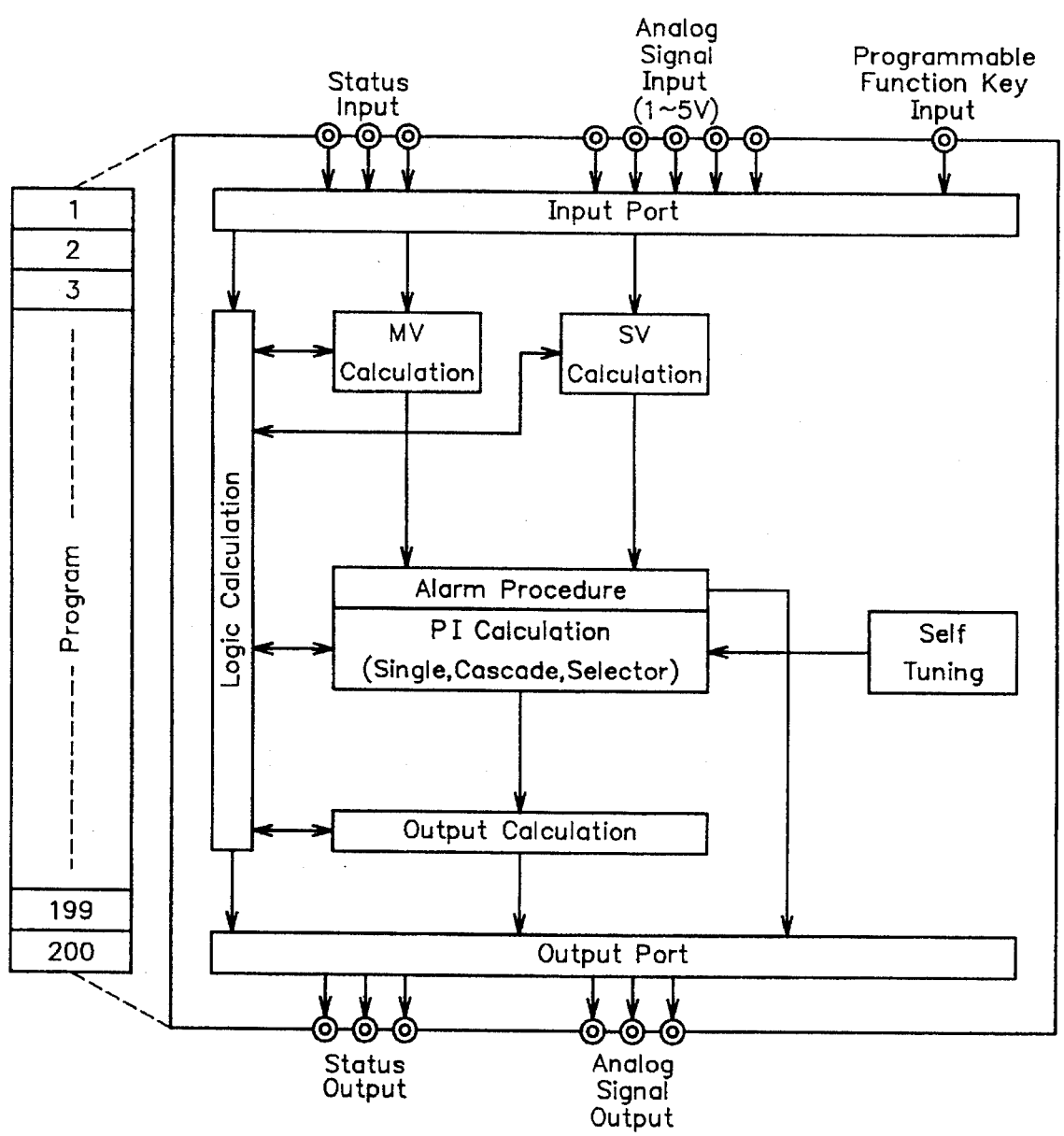
FIG. 17 is a schematic block diagram depicting the circuit arrangement of a fourth function module 3c used in the controller means of FIG. 11.

FIG. 17 shows a fourth function module 3c which serves as a programmable function module in controlling means 3 of FIG. 11, wherein both the control function and the calculation function are programmable so that the fourth function module functions as a progammable controller.

Even when the foregoing function modules are used in the controlling means 3, if any one of the function modules is selected by function selecting measn 42, various panels are rearranged in response to the selected function, and then the panels are expanded and displayed in accordance with a signal from the panel expanding key.

It should be noted that in the embodiment of FIG. 11, although the present panel is expanded from the tuning panel into the engineering panel, when both key KY7 and KY9 are simultaneously depressed, the engineering panels may be expanded at the same level when the tuning panel is expanded.

The embodiment of FIG. 11 is characterized by a plurality of function modules provided in the controller means, wherein any one of the modules may be selected as desired. Various panels are displayed on the display device in accordance with the functional module selected, with the selection being made to achieve optimum panel expansion. Thus, various functions of the modules, such as providing a single loop controller, providing a cascade controller, providing a selector controller, and providing a programmable controller, may be readily attained with the advantageous use of the same hardware.

Figure 18:
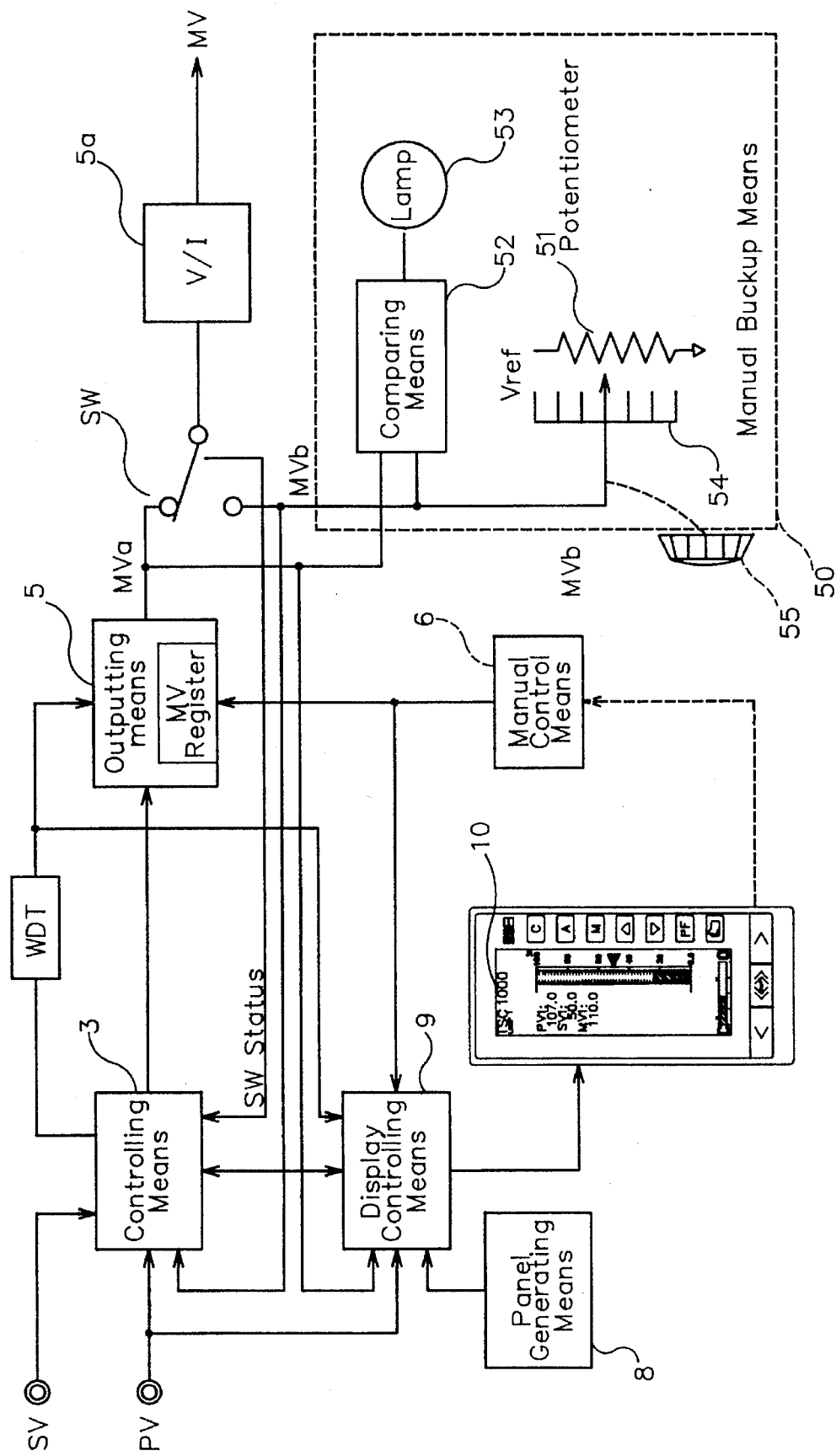
FIG. 18 is a schematic block diagram depicting the circuit arrangement of a fourth illustrative embodiment of the invention.
Figure 19:
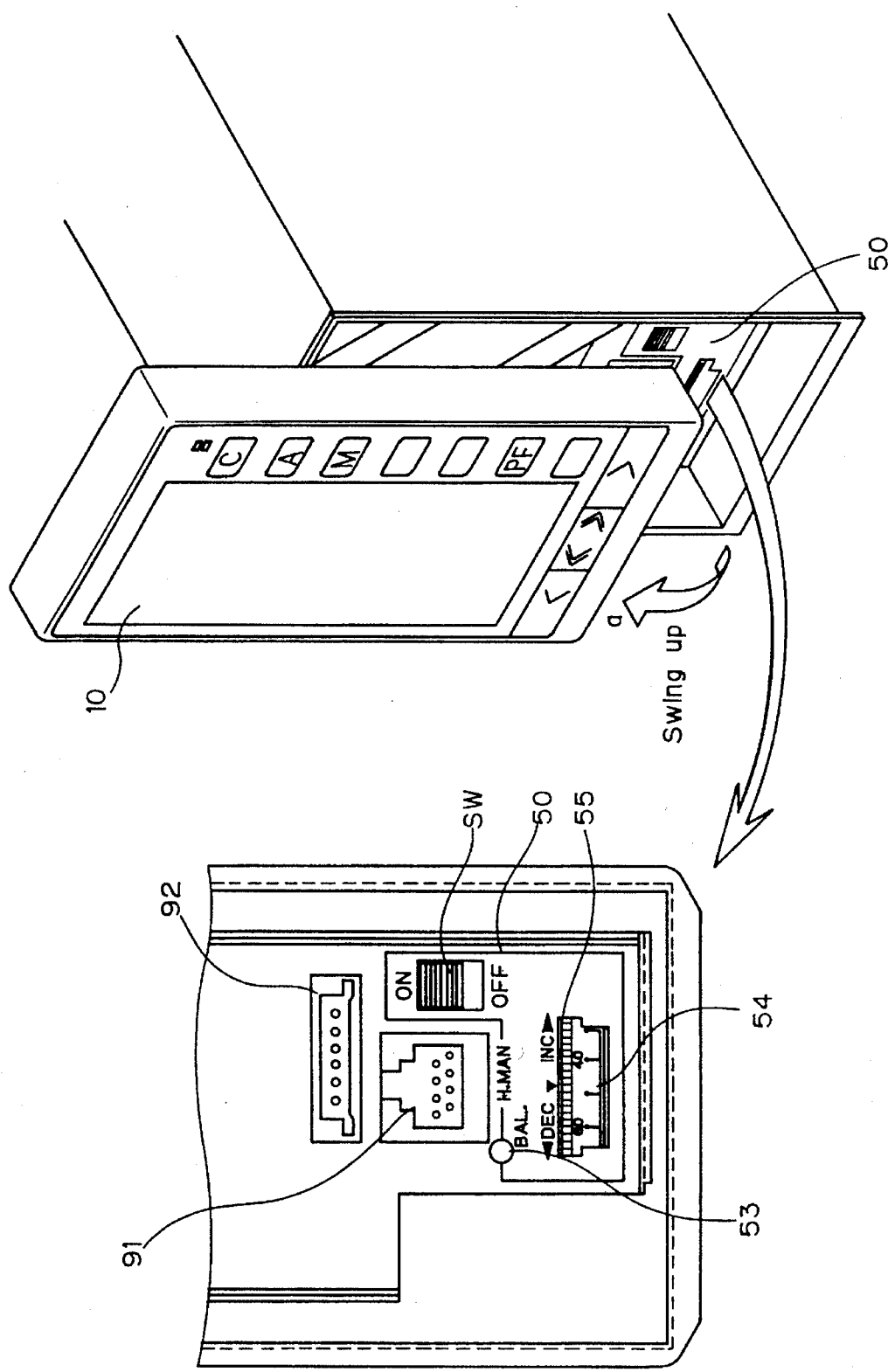
FIG. 19 is a conceptual diagram depicting the interrelationship between the front panel and the backup means for the embodiment of FIG. 18

FIG. 18 depicts another illustrative controller, which advantageously is capable of performing a backup operation even when either the controller means 3 or the display controlling means 9 is malfunctioning. In FIG. 19, switch SW is provided for selecting either the control output MVa from the outputting means 5, which includes an outputting register and an operating mdoe selecting switch, or a manual back up signal MVb, which will be discussed hereinafter, to feed the selected signal to a process. Manual selecting switch SW is normally positioned to a position where the control output MVa from outputting means 5 is selected, and is set to an opposite position by an operator during the manual back up operation. A switch status signal indicative of a selecting position of switch SW is applied to controlling means 3. A voltage and current signal converting circuit 5a converts a voltage signal via manual selecting switch SW into a current signal. However, circuit 5a need not output the signal as a voltage signal.

A manual backup means 50 is provided for sending a backup signal, which has been manually adjusted, via manual selecting switch SW during manual backup operation, to the process. A scale 54 is provided, for example, in a moving range of a brush position on the manual backup means 50. Also, a potentiometer 51 is contained in manual backup means 50, which can vary the value of manual backup signal MVb, in accordance with this scale.

A comparing means 52 compares the control output signal MVa, outputted by the outputting means 5, with backup signal MVb outputted by potentiometer 51. Lamp 53 is turned ON by an output signal from comparing circuit 52. Backup signal MVb is supplied to controller means 3.

FIG. 19 depicts conceptually the structural relationship of the setting positions between a front panel, on which the display device 10 is mounted, and manual backup means 50. Under normal control operating conditions, the instrument front panel, on which the display device 10 and keyboard KB are mounted, is positioned as shown in FIG. 1. In the manual backup condition, the front panel surface containing the display device can be swung upward, as shown by arrow a. When the front panel is swung upward, manual backup means 50 appears at the rear end, i.e. in back of the display device, so that manual selecting switch SW and wheel 55, used to move the brush of the potentiometer 51, can be manipulated. Also, the rear end contains communication connectors 91 and 92, which are connected to external devices.

When any one or more of the controlling means 3 and display controlling means 9 and outputting means 5 malfunction, the embodiment operates as follows.

Malfunction of controlling means 3

Failure occurring in controlling means 3 is detected by, for example, a known watch dog timer, or the like, and the extraordinary detecting signal is transferred to outputting means 5 or display controlling means 9. Upon receipt of the extraordinary detecting signal, outputting means 5 prohits a latch signal input from controlling means 3, and enables an internal outputting register to be accessed in response to the signal from manual controlling means 6. Display controlling means 9 neglects access by controlling means 3, and converts process value PV and control output MVa into corresponding digital signals using an A/D converter, and displays the digital signals on display device 10 in the form of bar graphs or digital values.

Consequently, while observing the MV display bar graph BG1 and the MV value displayed on the display device 10, an operator depresses the MV keys KY8–KY10 to change the value of the register (i.e. up/down counter) used in outputting means 5, so that control output value MVa can be manually operated.

Therefore, even when the controlling means malfunctions, the control output value MVa is automatically held, and then the controller is manually operated by using manual controlling means 6.

Malfunction of display controlling means 9, or outputting means 5

When display controlling means 9 malfunctions, since control output value MVa is not displayed, manual operation by use of manual control means 6 is not possible. Similarly, in case of malfunction of outputting means 5, neither manual operation by manual control means 6, nor control operation by controlling means 3, is possible.

To prevent such a worst case scenario, the operator must change the operating condition into a manual backup mode. Such a change to manual backup mode is carried out by first swinging upward the front panel, as shown by arrow a in FIG. 19, and manual backup means 50, positioned at the rear end, is brought into an operated condition.

In other words, when manual selecting switch SW is turned ON, i.e. select output value MVb, the manual backup signal from manual backup means 50 is outputted via select switch SW to the process. Then, the value of manual backup signal MVb is controlled by way of wheel 55, taking into account the value of scale 54, so that manual operation is achieved.

When changed to the manual backup mode, by turning ON switch SW, if the output value MVb of manual backup means 50 is not coincident with the control output MVa, which has been so far outputted, there is a possibility that the output signal outputted to the process will be rapidly changed.

Both comparing circuit 52 and lamp 53 operate to prevent such a possibility. Before manual selecting switch SW is turned ON, wheel 55 is rotated so that when manual selecting switch SW is turned ON with lamp 53 being ON, output value MVb will be coincident with control output value MVa, so that the change to the manual backup mode is accomplished safely.

It should be noted that the comparing circuit 52 is such that illumination strength of lamp 53 is varied in response to difference between values MVb and MVa, whereby visual warning by lamp 53 is given.

When the manual backup mode is set by manual backup means 50, both the switching status of switch SW and manual backup signal MVb information are applied to controlling means 3. When controlling means 3 is operated in a normal condition, controlling means 3 is operated so that control output value MVa applied to outputting means 5 is followed by manual backup signal MVb. As a consequence, even when the manual backup condition is changed back into a normal condition, there is no rapid change in the operation signal outputted to the process. Advantageously, such a changeover process is achieved without any substantial noise or abrupt signal change.

According to the embodiment, even if the controlling means malfunctions, if the display controlling means is operated normally, manual control by the manual controlling means is achieved. Also, even if the display controlling means or the outputting means malfunctions, manual operation by manual backup means 50 is achieved so that the controller has high reliability. Also, the manual operation is carried out at the front end of the controller in an area thereof which has a limited commercial value, so that the commercial attractiveness of the invention controller is not detracted from.

Figure 20:
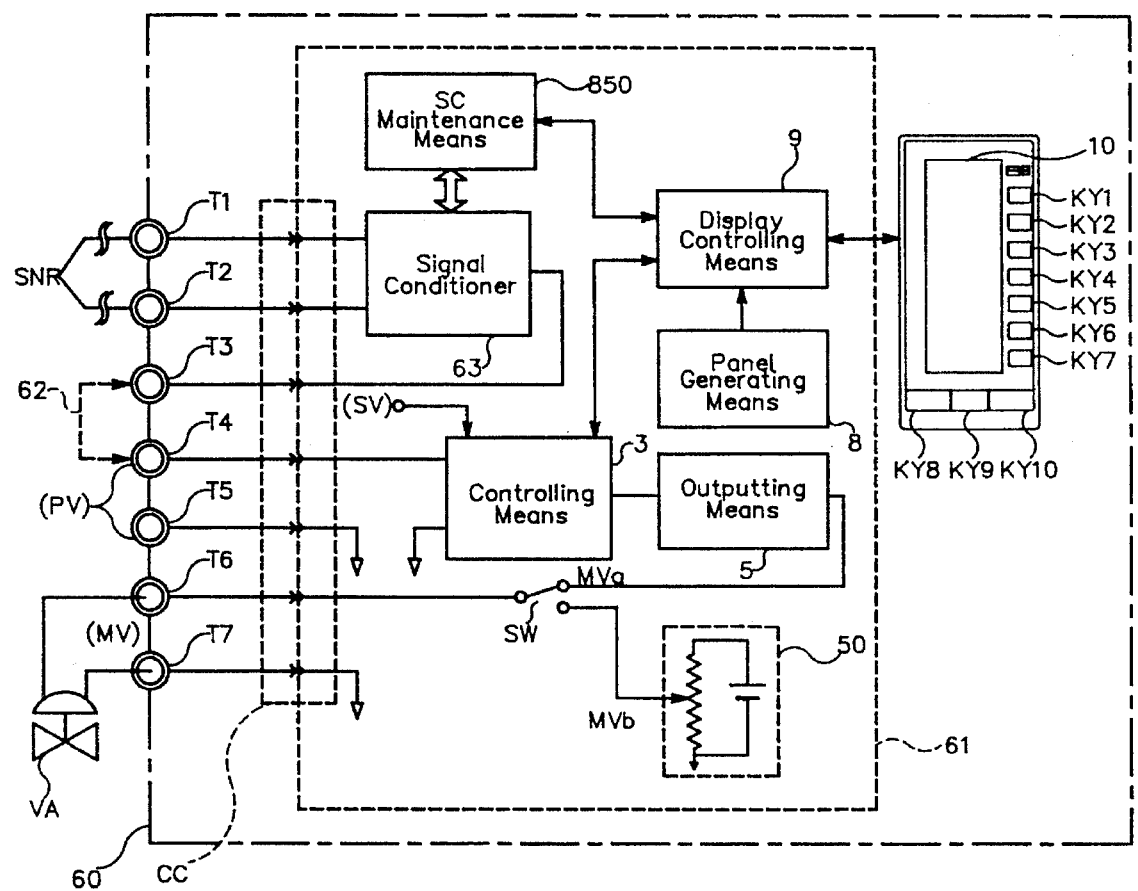
FIG. 20 is a schematic block diagram depicting the circuit arrangement of a fifth illustrative embodiment of the invention, wherein a signal conditioner for conditioning a signal from a sensor into a ruled signal, is installed in the controller.

FIG. 20 depicts a signal conditioner for conditioning a signal, obtained from a sensor mounted in a process, into a standardized signal, wherein a part 60 surrounded by a dot-dash line represents the case of the controller. A component 61 of the controller is stored in case 60 and comprises a printed circuit board on which a major part of the electronic circuit of the controller is mounted. Depicted is signal conditioner 63 for conditioning a signal obtained from sensor SNR into a standardized signal, and for supplying the conditioned signal to controlling means 3. Signal conditioner 63 comprises a microprocessor and other circuits which perform the function of processing the signals from the sensors.

A maintenance means 850 of signal conditioner SC includes a function for displaying, on display device 10 under control of display controlling means 9, a panel which is produced by engineering panel generating means 85 and is suitable for setting the function of signal conditioner 63 shown in FIG. 9; and a function for setting a predetermined function, corresponding to sensor SNR connected to signal conditioner 63, based on the signal from the operation key.

Case 60 comprises a pair of input terminals T1,T2 into which signals from sensor SNR is supplied. The supplied signal is conducted to an input terminal of signal conditioner 63. An external terminal T3 is connected to an output terminal of signal conditioner 63. A pair of input terminals T4,T5 receives the standardized process value PV. The standardized process value PV is supplied to the input terminal of controlling means 3. Output terminals T6, T7 are connected to operation terminal VA, such as a valve. The operation signal selected via switch SW is outputted at T6,T7.

A detachable connector CC electrically connects the respective terminals of case 60 to the electrical circuit used in component 61.

If standardized process value PV, comprising, for example, 1 to 5 V signals, is inputted into the controller, standardized signal PV is supplied to terminals T3,T4. On the other hand, when the sensor is connected to the controller, the signal from the sensor SNR may be supplied directly to terminals T1,T2. Also, lead wire 62, indicated by a dotted line, is connected between terminal T3 and terminal T4 to which the standardized signal PV is inputted.

As a result, the standardized signal PV outputted from the signal controller 63 is applied via terminals T3 and T4 to controller 3.

As previously discussed, FIG. 9 represents the signal conditioner maintenance panel displayed on display device 10 when the signal conditioner 63 is being maintained by maintenance means 850 and display controlling means 9, and also the functions assigned the the keys when the signal conditioner maintenance panel is displayed.

Normally, the SC (signal conditioner) maintenance panel is used before the controller is operated, and various functions may be placed in the signal conditioner 63 when the control calculation are stopped.

According to the embodiment, controlling means 3 performs control calculation operation,as a controller, based on the signal supplied to terminals T4, T5. That is, when sensor SNR is connected directly to terminals T1, T2, the signal standardized by signal conditioner 63, used in component 2, is inputted to terminals T4,T5. On the other hand, when the sensor SNR is not connected directly to terminals T1, T2, the signal standardized by an externally provided signal conditioner is supplied to terminals T4, T5. Then, the PID control calculation is executed with respect to the deviation between the process value PV and the set value SV, set by SV keys KY4, KY5, and the calculation result is outputted via switch SW, and output terminals T6, T7 to terminal $V_A$.

According to the embodiment, since sensor SNR may be connected directly to terminals T1, T2 used in the case of the controller, a simple wiring structure can be obtained. Moreover, the instrument panel is compact. Also, the functions of signal conditioner 63 may be set in a simple manner by using display device 10. In addition, since the output signal from signal conditioner 63 is supplied via lead wire 62 to controlling means 3, when such lead wire 62 is connected between terminals T3, T4, it is difficult for the standardized signal to be applied to terminal T4. Also, it is difficult for another lead wire to be connected. Thus, both of these signals can be applied to the relevant terminals without any confusion.

Figure 21:
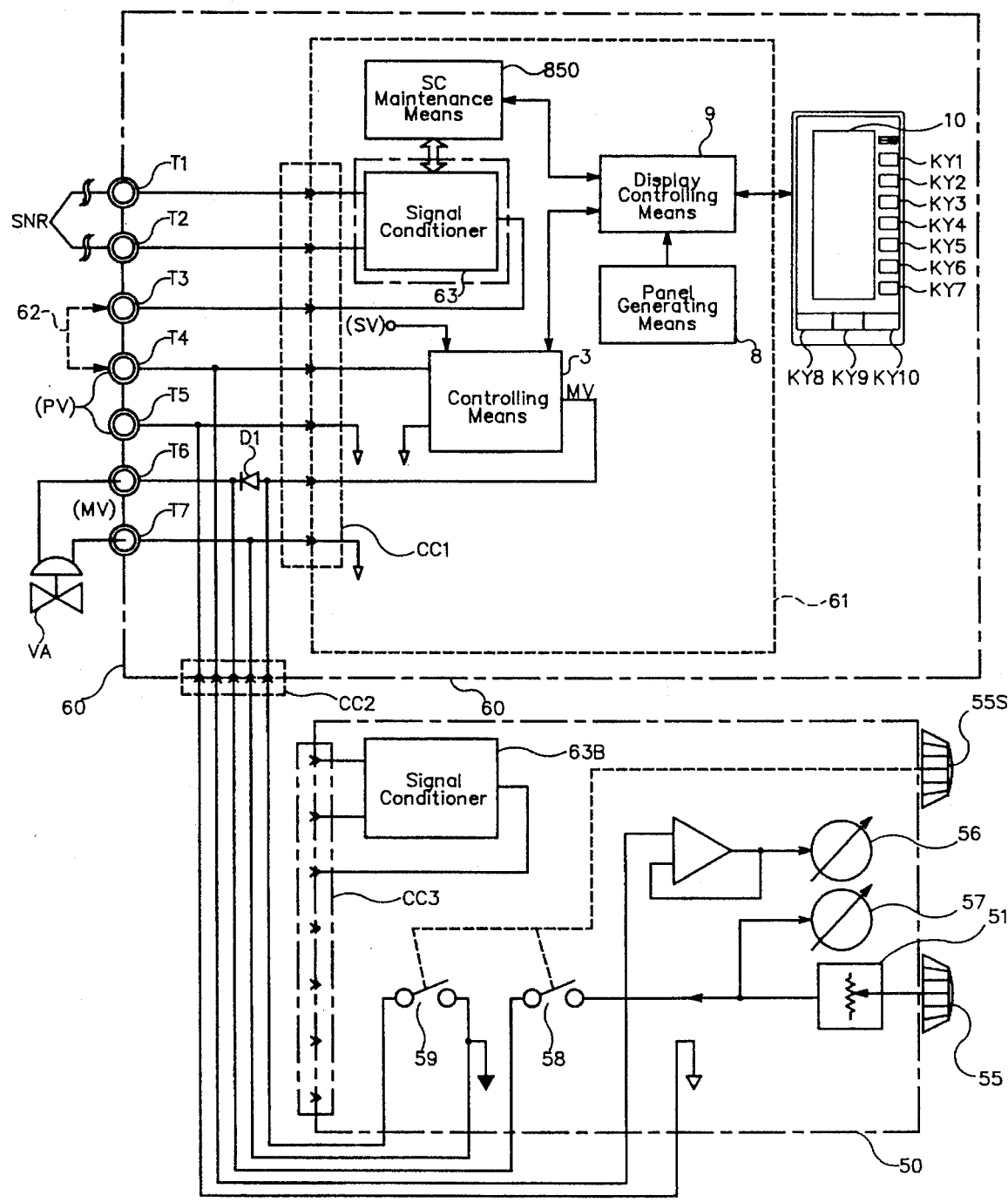
FIG. 21 is a schematic block diagram depicting the circuit arrangement of a sixth illustrative embodiment of the invention, wherein the signal from a sensor is directly inputted and wherein a backup apparatus is used.

FIG. 21 shows a backup apparatus which is constructed separately from the main apparatus so that the signal from the sensor can be directly inputted and the operation signals outputted to the process and the process monitoring operation can be backed up without any interruption during malfunction or maintenance.

In FIG. 21, a portion 60 surrounded by a dot-dash line defines an outer casing of the controller. A component 61 of the controller is stored in the outer case 60, and comprises a printed circuit board or the like, on which a major part of the electronic circuit of the controller is mounted. Except for the backup apparatus 50 of the embodiment, a portion is similar to that of FIG. 20, in which a signal conditioner 63 is detachable with respect to component 61.

Case 60 comprises signal output terminals T6, T7, which are connected to terminal VA, such as a valve, and to which an operation signal MV from the controlling means 3 is outputted via diode D1. An internal connector CC1 electrically connects the respective terminals to the electronic circuit of component 61. Component 61 is detachable from case 60. An outer connector CC2, which may be connected to an external device, is connected to process value input terminals T4, T5 and to both ends of diode D1, and to output terminals T6, T7. The backup apparatus 50, which may be provided separately from case 60, is constructed to monitor either process value PV, or the signal from signal conditioner 63, and is connected via outer connector CC2 to the main body of the controller.

Backup apparatus 50 comprises a PV pointer 56 for indicating the signal outputted to terminals T4, T5 , and operation signal outputting means 51 for outputting a manual operation signal, as controlled by MV operation knob 55; and an MV pointer 57 for indicating the signal outputted by operation signal outputting means 51. Although the operation signal is outputted by power supplied from a buiilt in type battery,the outputting means can also be operable by a line power source (not shown) in order to avoid the limited operation time of a battery.

A switch 58 is used to supply the signal outputted from outputting means 51 to output terminal T6. Another switch 59 is provided to prevent the output from controlling means 3 to be outputted to output terminals T6, T7. Switches 58 and 59 are arranged to be driven in synchronism with backup selecting switch knob 55. A signal conditioner 63B is provided which is detachable from backup apparatus 50.

An internal connector CC3 is provided having the same arrangement of internal connector CC1, and functions to enable backup apparatus 50 to be stored in case 60 instead of in component 61. In other words, internal connector CC3 is so arranged that when component 61 is removed from the case, and the backup apparatus 50 is stored in the case instead thereof, the signals obtained from input terminals T1, T2 are applied to signal conditioner 63B, and then the signal from signal conditioner 63B is outputted to exterminal terminal T3.

Figure 22:
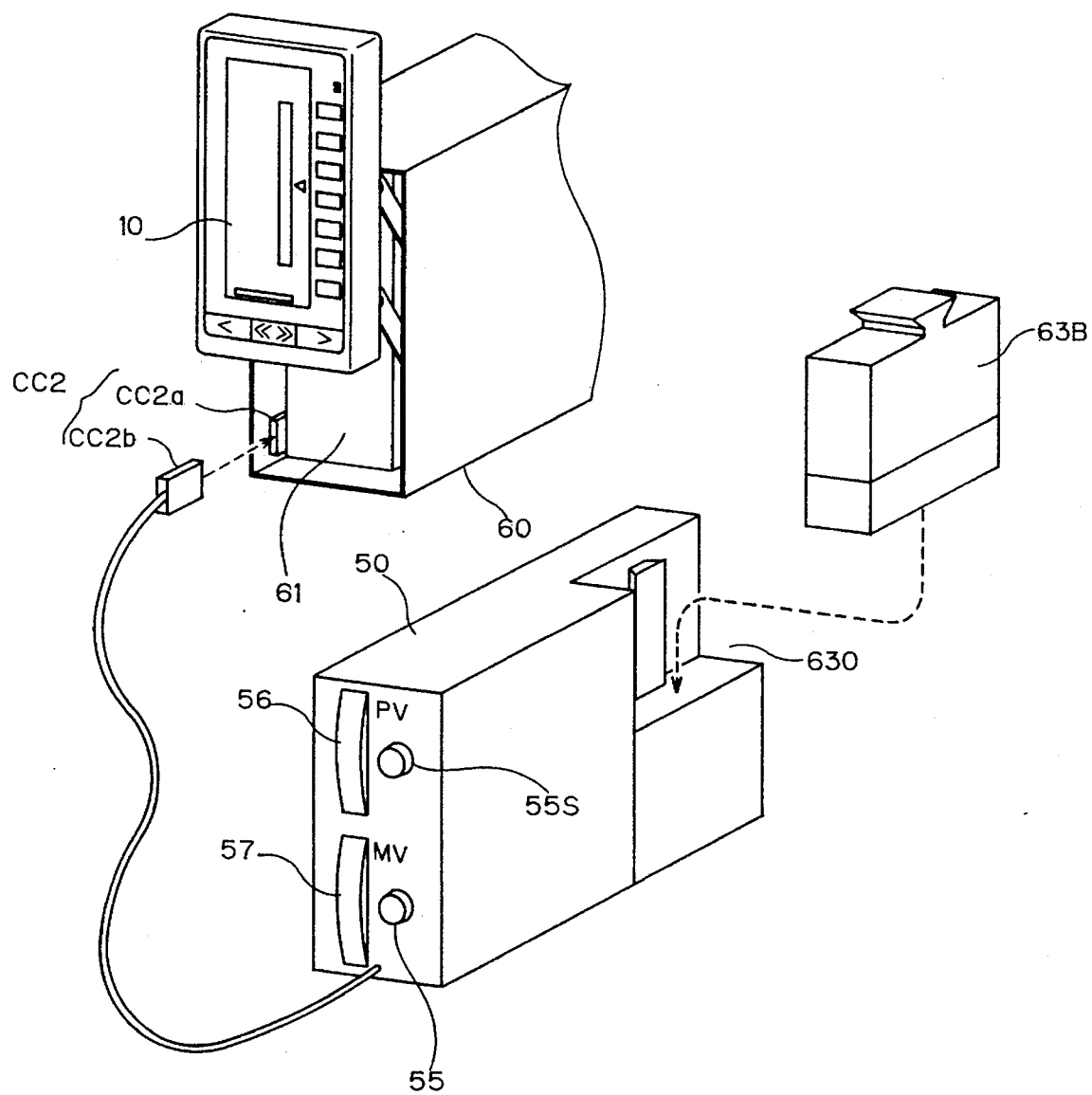
FIG. 22 is a conceptual view depicting the main part of the controller and the backup apparatus of FIG. 21.

FIG. 22 shows an arrangement of the controller and backup apparatus, comprising controller 61, the front panel of which includes a display device 10 which is swung upward. When the front panel is swung upward, one end of external connector CC2 appears at a rear end of the front panel so that the connector CC2 is connectable to backup apparatus 50. Although component 61 of controller 61 , containing display device 10, is stored in case 60, component 61 may removed from the inside of case 60, and separated therefrom for desired maintenance, or when a malfunction occurs.

In the backup apparatus 50, there are arranged on the front panel thereof PV pointer 56, MV pointer 57, MV knob 55, and backup selecting switch knob 55S. The outer shape of the backup apparatus 50 has substantially the same shape as component 61 of the controller. A pocket portion 630, which is constructed to mount signal conditioner 63B, is positioned at the rear end of backup apparatus 50. The pocket portion 630, with signal conditioner 63B mounted therein, may be stored within case 60.

Backup apparatus 50 is connected, via external connector CC2, to the main body of the controller, and is operable even after being separated from the main body. Backup apparatus 50 may also be operated while stored in case 60. Component 61 of the controller may be removed from the case 60 and backup apparatus 50 may be stored therein instead. Signal conditioner 63 provided within component 61 may be removed. Thereafter, signal conditioner 63B may be mounted in pocket portion 630 provided at the rear end of backup apparatus 50.

With the described construction, when process value PV comprising a standardized signal, e.g. 1 to 5 V signal, is inputted to the controller, the standardized signal PV is applied to the process value input terminals T3, T4. On the other hand, when the sensor is connected directly to the controller, that is, a signal other than the standardized signal is inputted, the signal from sensor SNR is supplied to terminals T1, T2, and a lead wire 62, indicated by the dotted line, is connected to terminals T3, T4. Consequently, the sensor signal supplied directly from the sensor is applied to signal conditioner 63, in which this signal is converted into the standardized signal. The standardized signal is outputted to external terminal T3, and again supplied via lead wire 62 and process value input terminal T4, to controller means 3 used in component 61.

The control calculation result obtained from controlling means 3 is outputted via diode D1 to terminals T6, T7, and then transmitted to terminal VA.

In principle, the main body of the controller is operated solely. However, when component 61 malfunctions, or maintenance is desired, or needs to be checked, the controller is backed up by backup apparatus 50. In this case, the front panel of the controller is swung upward, and the other end CC2b of external connector CC2, to be connected to backup apparatus 50, is connected to one end CC2a thereof appearing at the inside of the controller.

In backup apparatus 50, backup switches 58,59 are switched OFF at the beginning stage, and the connection and disconnection of external connector CC2 do not produce any adverse affect on the operation of component 61.

When external connector CC2 is connected, the signal supplied between terminals T4 and T5 (i.e. the signal from condition 63 when the sensor is connected direclty to terminals T1, T2) is supplied, via a buffer amplifier used in the backup apparatus 50, to PV pointer 56. Then, such a signal can be monitored. At this time, MV pointer 57 of backup apparatus 50 indicates the output signal from outputting means 51.

Under such condition, when switches 58,59 are turned OFF by operating backup select knob 55S, the signal from component 61 is prevented from being outputted. Instead of this output signal, the output signal from outputting means 51 is supplied, via switch 58, to terminals T6, T7, to the process. As a result, the operation signal outputted to the process is not instantaneously interrupted and may be changed into the backup mode condition.

It should be noted that if the operation condition is changed into the backup mode condition after such a balance operation that the value of MV pointer of the output signal from the output means 51 is coincident with an output value from component 61, the changing operation to the backup mode can be performed without any substantial noise or sharp or abrupt signal changes. The output value from component 61 is displayed on display device 10, or indicated by an operation output pointer, not shown.

In the backup mode, the operation terminal may be manually operated by manipulating the MV operation knob, while monitoring the value of the operation signal outputted to the process, or monitoring the indications of the PV pointer 56.

The embodiment is advantageous in that manual operation can be carried out under backup conditions, while monitoring the PV value, even when the sensor is directly connected to the controller.

Figure 23:
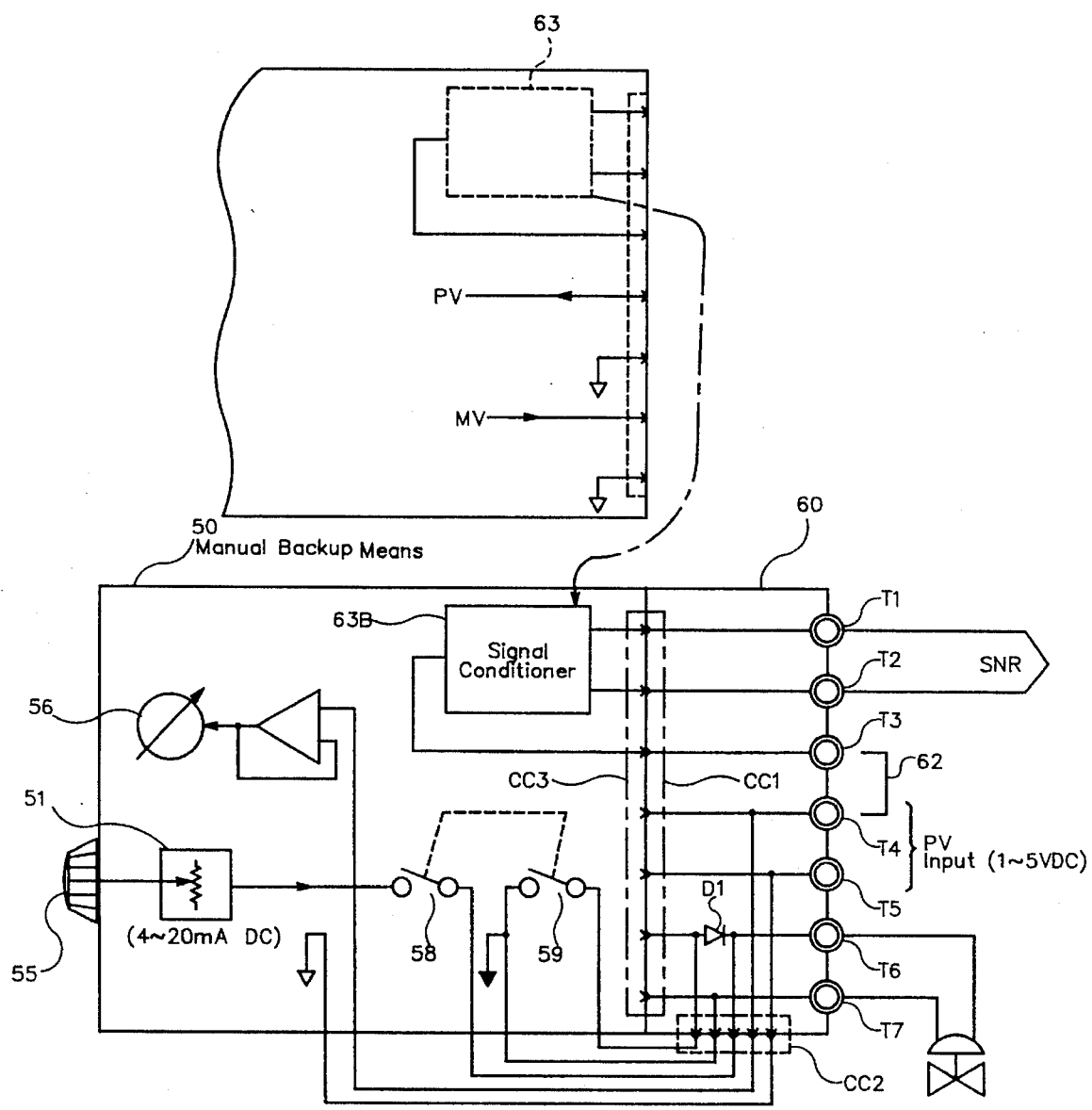
FIG. 23 is a diagram depicting connection of the backup apparatus which may be stored in the case of the controller of FIG. 21.

FIG. 23 depicts a condition when component 61 of the controller is removed from the case 60, wherein signal conditioner 63, provided in component 61, is removed therefrom. Signal conditioner 63 is mounted on pocket portion 630, provided at the rear end of backup apparatus 50. Backup apparatus 50 is stored in case 60 instead of of component 61. Advantageously, even when component 61 is removed from case 60, the output signal from outputting means 51 is outputted to the process under backup mode condition, no adverse affect occurs on the process. If backup apparatus 50 is stored in case 60, case 60 is mutually connected to internal connectors CC1 and CC3 of backup apparatus 50, and the signal obtained from signal conditioner 63B, which may be mounted on backup apparatus 50, is indicated by pointer 56. Thus, even when the sensor is directly coupled to the controller, the PV value may be continuously monitored by PV pointer 56, which is provided at the side of the backup apparatus.

Advantageously, the controller of the invention has great versatility, in that a variety of controller types of functions can be realized using the same hardware. For example, the above description describes handling of a single process value PV, but, a plurality of such values can be handled. The controller can operate as a single loop, a cascade controller, etc. By connecting more than two sensors to the controller, we can accomplish selector control. A plurality of process values and amounts can be inputted. Moreover, since the sensor can be connected directly to the controller, wiring is considerably simplified, and the instrument panel is made substantially more compact than now on the market. Also, backup operation can be carried out manually or otherwise while monitoring the PV values on the indicator located at the side of the backup apparatus. Various alternatives exist for placing different components in the case. Also, malfunctions, maintenance, and checking or inspection are all handled with ease and reliability.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A controller wherein a process value obtained from a process in inputted, a control calculation is carried out based upon a control parameter, and a control output is supplied to the process, said controller comprising a container comprising
  a main body (CL) consisting of an open box having four sides, a rear part, and an open front portion,
  a front part (PL) fitted over said open front portion of said main body and containing on a front face thereof display means and key means;

display means (10) provided in said front part for displaying separately or in combination
  an operating panel wherein values of process and control output are shown as bar graphs,
  a trend graph panel of trend of process values,
  control calculating panel, and
  a tuning panel;

panel expanding means (KY7) provided in said front part for manually instructing said display means to expand contents of said panels to be displayed in said display means;

a plurality of key means (KY1–6, 8–10) provided in said front part and positioned besides and beneath said display means for manually setting control operations and various parameters;

operating panel generating means (81) contained in said main body and operable by one of said plurality of key means assigned such function, for generating signals to cause display of process values and control output values as bar graphs on the operating panel to be displayed in said display means;

trend graph panel generating means (82) contained in said main body and operable by one of said plurality of key means assigned such function, for generating signals to cause display of transition of the process values as a trend graph on the trend graph panel to be displayed in said display means tuning panel generating means (83) contained in said main body and operable by one of said plurality of key means assigned such function, for generating signals to cause display on the tuning panel to be displayed in said display means of symbols indicative of functions assigned to said plurality of key means at positions corresponding to said plurality of key means, and information used to control a control parameter used in said control calculation;

display controlling means (9) contained in said main body for selecting for display in said display means a combination of said operating panel and said trend graph panel upon receipt of a signal from said panel expanding means, and said tuning panel singly upon concurrent receipt of a signal from said panel expanding means and a signal resulting from operation of one of said plurality of key means; and key function changing means (11) contained in said main body for changing functions assigned to said plurality of key means and symbols displayed in said tuning panel corresponding to the changed functions of said plurality of key means;

wherein all of the manually operable components and the display means are contained in the front face of said front part of said container for improved appearance and so that any two of said manually operable components can be accessed concurrently with two digits of one hand by an operator.

2. The controller of claim 1, wherein one of said plurality of key means has a function of a change key means so that when said change key means is operated said tuning panel and either said operating panel or said trend graph panel is displayed.

3. The controller of claim 1, further comprising alarm panel generating means for displaying an alarm panel of a variety of alarm information in said display means, wherein said display controlling means selects for display said alarm panel when a signal from said panel expanding means is received and either said operating panel or said trend graph panel is currently displayed.

4. The controller of claim 1, further comprising engineering panel generating means for displaying an engineering panel in said display means comprising at least one of the following information, selecting of the function of said controller, setting operation of an input range, and setting operation of a communication function; wherein said display controlling means selects for display said engineering panel in said display means when signals from said panel expanding means and one of said plurality of key means are received concurrently and when said tuning panel is currently displayed in said display means.

5. The controller of claim 1, wherein said display means comprises means for forming a bar graph by aligning convex-concave portions at a predetermined pitch in a direction along which said bar graph is expanded and contracted.

6. The controller of claim 1, further comprising one or more control elements which perform the control calculations;

a first function module means for executing a control calculation using one of said control elements;

a second function module means for executing a control calculation using two of said control elements;

function selecting means for selecting any one of said first and second function module means; and wherein said display controlling means comprises means for automatically rearranging a panel displayed in said display means based on the function selected by said function selecting means.

7. The controller of claim 6, wherein said display controlling means selects for display as an operating panel in said display means, a first operating panel for displaying both the process value and the control output value as bar graphs, and a trend graph panel for displaying the process value as a trend graph indicative of past transition of the process value, when said first function module means is selected.

8. The controller of claim 6, wherein said display controlling means selects for display as an operating panel in said display means, a first operating panel for displaying one process value and the control output value as bar graphs, a first trend graph panel indicative of past transition of one process value, a second operating panel for displaying another process value and the control output value as bar graphs, and a second trend graph panel indicative of past transition of said other process value, when said second function module means is selected.

9. The controller of claim 6, wherein said display controlling means selects for display in said display means an operating panel for executing a control operation of the process, tuning panels for various parameters set into said one or more control elements, and engineering panel for setting various functions executed by said one or more control elements.

10. The controller of claim 6, wherein said display controlling means provides for display of a menu panel for selecting items corresponding to tuning panels and engineering panels prior to panel expansion into said tuning panels and said engineering panels.

11. The controller of claim 6, wherein said second function module means functions as a cascade control by serially connecting two of said control elements.

12. The controller of claim 6, wherein said second function module means functions as a selector controller by connecting two of said control elements in parallel.

13. The controller of claim 6, further comprising a third function module means for providing a control function and a calculation function; and wherein said function selecting means selects any one of said first, second and third function module means.

14. The controller of claim 1, wherein a controlling means performs the control calculation by inputting the process value and outputs a signal; and wherein said display controlling means comprises means for receiving the process value and a control output value and for displaying said process value and said control output value on said display means; and further comprising manual controlling means for manually controlling the control output value displayed on said display means and for outputting a signal;

outputting means for receiving the signal from said controlling means and the signal from said manual controlling means, for holding both said signals, and for outputting a signal to a process;

manual backup means for manually controlling an output thereof and for outputting a manual backup signal; and a manual selecting switch for selecting the signal from said outputting means and the signal from said backup means, and for outputting a selected signal to said process.

15. The controller of claim 14, wherein said manual backup means comprises a potentiometer.

16. The controller of claim 14, wherein said manual backup means comprises a coincident detecting circuit for detecting whether or not the output signal from said outputting means is coincident with the signal from said manual backup means.

17. The controller of claim 14, wherein comprising means for arranging said controlling means during manual backup so that the signal from said manual backup means is inputted and a signal following said signal from said manual backup means is outputted, whereby a change from the manual backup condition to the control condition by said controlling means is performed without any abrupt changes of signals.

18. The controller of claim 14, wherein said display means comprises a portion which is movable at a front part of said controller so that when said portion is moved upward, said manual backup means is positioned at the rear of said display means in such a manner that the manual backup means can be manipulated from the front of said controller.

19. The controller of claim 1, wherein a controlling means performs the control calculation by receiving a signal related to a process signal and a control target value, and outputs a calculation result to the process as an operation signal; and wherein said display means is equipped with at least one key and comprises means for displaying various operation information required to control operation and to monitor said control operation; and further comprising signal conditioner means for conditioning a signal from a sensor into a standarized signal and for supplying the conditioned signal to said controlling means; and signal conditioner maintenance means for displaying information required to set the function of said signal conditioner means on said display means, and for providing a predetermined function to said signal conditioner means based on a signal from said at least one key.

20. The controller of claim 19, further comprising an exterminal terminal connected to said signal conditioner means; and an input terminal for conducting a signal to said controlling means and for inputting a standardized process value, wherein an output of said conditioner means is supplied to said controlling means by connecting said external terminal to said internal terminal.

* * * * *